United States Patent
Mills et al.

(10) Patent No.: US 11,487,846 B2
(45) Date of Patent: Nov. 1, 2022

(54) PERFORMING MULTIPLY AND ACCUMULATE OPERATIONS IN NEURAL NETWORK PROCESSOR

(71) Applicant: Apple Inc., Cupertino, CA (US)

(72) Inventors: Christopher L. Mills, Saratoga, CA (US); Erik K. Norden, San Jose, CA (US); Sung Hee Park, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 1217 days.

(21) Appl. No.: 15/971,444

(22) Filed: May 4, 2018

(65) Prior Publication Data
US 2019/0340486 A1 Nov. 7, 2019

(51) Int. Cl.
*G06F 17/16* (2006.01)

(52) U.S. Cl.
CPC .................................. *G06F 17/16* (2013.01)

(58) Field of Classification Search
CPC ........ G06F 17/15; G06F 17/153; G06F 17/16; G06F 7/5443; G06N 3/02–0675
See application file for complete search history.

(56) References Cited

U.S. PATENT DOCUMENTS

| 9,858,636 | B1* | 1/2018 | Lim | G06T 5/001 |
|---|---|---|---|---|
| 10,310,768 | B1* | 6/2019 | Gauria | G06T 7/00 |
| 2016/0342889 | A1 | 11/2016 | Thorson et al. | |
| 2016/0379686 | A1 | 12/2016 | Burger et al. | |
| 2017/0011006 | A1 | 1/2017 | Saber et al. | |
| 2017/0011288 | A1 | 1/2017 | Brothers et al. | |
| 2018/0046894 | A1* | 2/2018 | Yao | G06F 7/483 |
| 2018/0129935 | A1* | 5/2018 | Kim | G06N 3/082 |
| 2018/0137407 | A1* | 5/2018 | Du | G06N 3/063 |
| 2019/0026249 | A1* | 1/2019 | Talpes | G06N 3/0481 |
| 2019/0325296 | A1* | 10/2019 | Fowers | G06N 3/0454 |
| 2021/0149983 | A1* | 5/2021 | Tanaka | G06N 3/0454 |

OTHER PUBLICATIONS

Ren, U.S., & Xu, L. (2015). On Vectorization of Deep Convolutional Neural Networks for Vision Tasks. ArXiv, abs/1501.07338. (Year: 2015).*

Lai, L., Suda, N., & Chandra, V. (2018). CMSIS-NN: Efficient Neural Network Kernels for Arm Cortex-M CPUs. ArXiv, abs/1801.06601. (Year: 2018).*

* cited by examiner

*Primary Examiner* — Matthew D Sandifer
*Assistant Examiner* — Carlo Waje
(74) *Attorney, Agent, or Firm* — Fenwick & West LLP

(57) ABSTRACT

Embodiments relate to a neural processor circuit including a plurality of neural engine circuits, a data buffer, and a kernel fetcher circuit. At least one of the neural engine circuits is configured to receive matrix elements of a matrix as at least the portion of the input data from the data buffer over multiple processing cycles. The at least one neural engine circuit further receives vector elements of a vector from the kernel fetcher circuit, wherein each of the vector elements is extracted as a corresponding kernel to the at least one neural engine circuit in each of the processing cycles. The at least one neural engine circuit performs multiplication between the matrix and the vector as a convolution operation to produce at least one output channel of the output data.

20 Claims, 16 Drawing Sheets

PERFORMING MULTIPLY AND ACCUMULATE OPERATIONS IN NEURAL NETWORK PROCESSOR

BACKGROUND

1. Field of the Disclosure

The present disclosure relates to a circuit for performing convolution neural network and more specifically to systems and methods for performing multiply-accumulate operations in a neural network processor.

2. Description of the Related Arts

An artificial neural network (ANN) is a computing system or model that uses a collection of connected nodes to process input data. The ANN is typically organized into layers where different layers perform different types of transformation on their input. Extensions or variants of ANN such as convolution neural network (CNN), recurrent neural networks (RNN) and deep belief networks (DBN) have come to receive much attention. These computing systems or models often involve extensive computing operations including multiplication and accumulation. For example, CNN is a class of machine learning technique that primarily uses convolution between input data and kernel data, which can be decomposed into multiplication and accumulation operations.

Depending on the types of input data and operations to be performed, these machine learning systems or models can be configured differently. Such varying configuration would include, for example, pre-processing operations, number of channels in input data, kernel data to be used, non-linear function to be applied to convolution result, and applying of various post processing operations. Using a central processing unit (CPU) and its main memory to instantiate and execute machine learning systems or models of various configuration is relatively easy because such systems or models can be instantiated with mere updates to code. However, relying solely on the CPU for various operations of these machine learning systems or models would consume significant bandwidth of a central processing unit (CPU) as well as increase the overall power consumption.

SUMMARY

Embodiments relate to a neural processor circuit, which may include multiple neural engine circuits, a data buffer, and kernel fetcher circuit. The neural engine circuits are configured to perform convolution operations on at least a work unit of input data and kernel data. The data buffer is between the neural engine circuits and a system memory external to the neural processor circuit. The data buffer stores at least a portion of the input data received from the system memory for sending to the neural engine circuits. The portion of the input data includes the work unit of the input data. The data buffer further stores output data received from the neural engine circuits. The kernel fetcher circuit is placed between the neural engine circuits and the system memory. The kernel fetcher circuit receives one or more kernels from the system memory, and sends a corresponding kernel to the neural engine circuits.

In one or more embodiments, at least one of the neural engine circuits receives matrix elements of a matrix as at least the portion of the input data from the data buffer over multiple processing cycles. The at least one neural engine circuit further receives vector elements of a vector from the kernel fetcher circuit. Each of the vector elements is extracted as the corresponding kernel to the at least one neural engine circuit in each of the processing cycles. The at least one neural engine circuit performs multiplication between the matrix and the vector as a convolution operation to produce at least one output channel of the output data.

Figure 1:
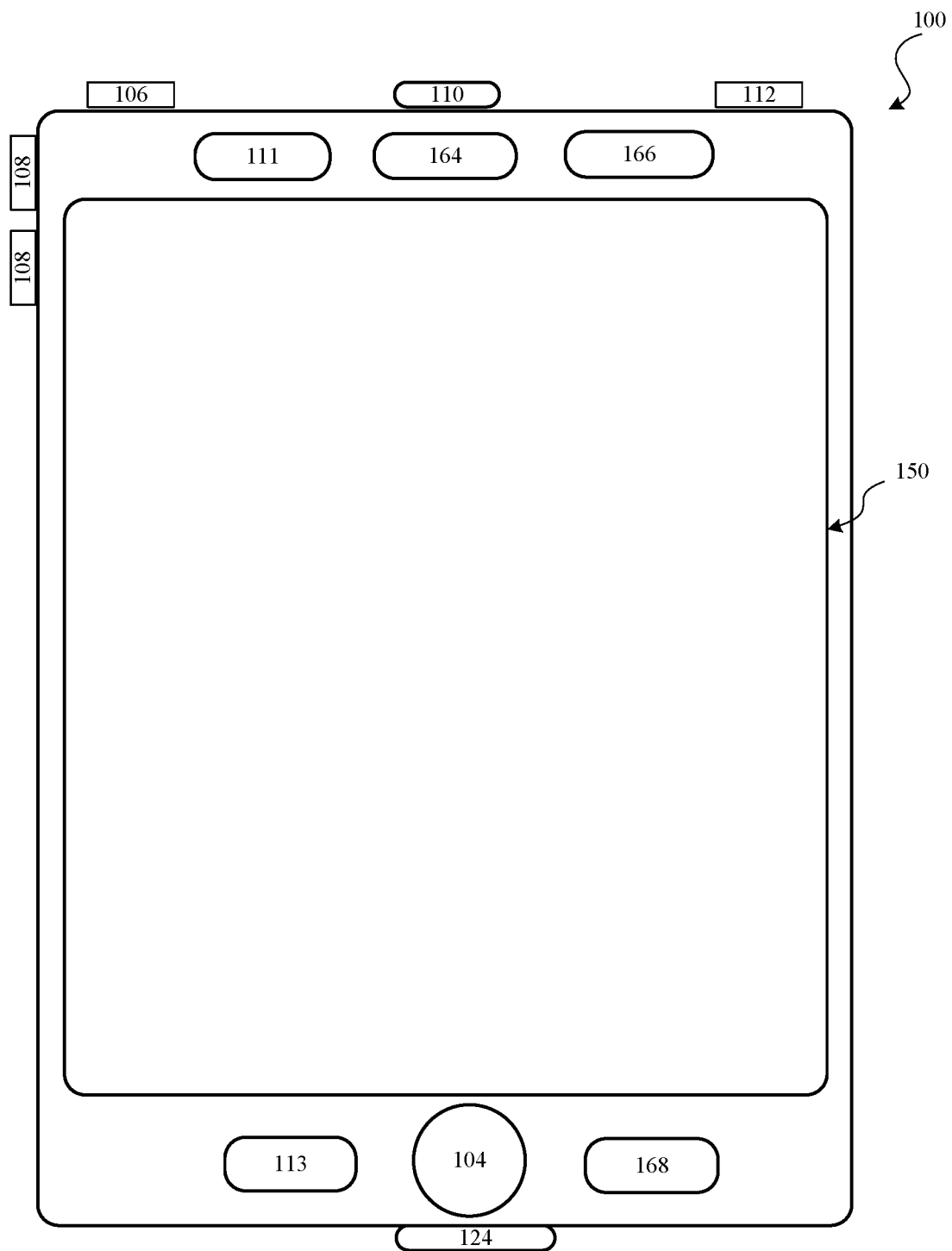
FIG. 1 is a high-level diagram of an electronic device, according to one embodiment

The figures depict, and the detail description describes, various non-limiting embodiments for purposes of illustration only.

DETAILED DESCRIPTION

Reference will now be made in detail to embodiments, examples of which are illustrated in the accompanying drawings. In the following detailed description, numerous specific details are set forth in order to provide a thorough understanding of the various described embodiments. However, the described embodiments may be practiced without these specific details. In other instances, well-known methods, procedures, components, circuits, and networks have not been described in detail so as not to unnecessarily obscure aspects of the embodiments.

Embodiments of the present disclosure relate to performing matrix-vector multiplications, matrix-matrix multiplications and element-wise operations as convolution operations on input data and kernel data using one or more neural engine circuits in a neural processor circuit. In one embodiment, matrix elements are broadcast from the data buffer to the at least one neural engine circuit as a portion of input data, and vector elements are received at the at least one neural engine circuit from a kernel fetcher circuit as kernel data. In an alternative embodiment, vector elements are broadcast from the data buffer to the at least one neural engine circuit as the portion of input data, and matrix elements are received at the at least one neural engine circuit from the kernel fetcher circuit as kernel data. In one or more embodiments, one set of matrix elements is broadcast from the data buffer to the at least one neural engine circuit, and another set of matrix elements is received from the kernel fetcher circuit at the at least one neural engine circuit. The at least one neural engine circuit then performs matrix-matrix multiplication between the two sets. In one or more other embodiments, a first set of elements and a second set of elements are broadcast from the data buffer to the at least one neural engine circuit. The at least one neural engine circuit then performs element-wise multiplication between the sets.

A processing cycle described herein refers to a time period for sending a work unit to a neural processing circuit and then performing a multiply-add operation on the work unit in a neural engine circuit of the neural processing circuit.

Exemplary Electronic Device

Embodiments of electronic devices, user interfaces for such devices, and associated processes for using such devices are described. In some embodiments, the device is a portable communications device, such as a mobile telephone, that also contains other functions, such as personal digital assistant (PDA) and/or music player functions. Exemplary embodiments of portable multifunction devices include, without limitation, the iPhone®, iPod Touch®, Apple Watch®, and iPad® devices from Apple Inc. of Cupertino, Calif. Other portable electronic devices, such as wearables, laptops or tablet computers, are optionally used. In some embodiments, the device is not a portable communications device, but is a desktop computer or other computing device that is not designed for portable use. In some embodiments, the disclosed electronic device may include a touch sensitive surface (e.g., a touch screen display and/or a touch pad). An example electronic device described below in conjunction with FIG. 1 (e.g., device 100) may include a touch-sensitive surface for receiving user input. The electronic device may also include one or more other physical user-interface devices, such as a physical keyboard, a mouse and/or a joystick.

Figure (FIG. 1 is a high-level diagram of an electronic device 100, according to one embodiment. Device 100 may include one or more physical buttons, such as a "home" or menu button 104. Menu button 104 is, for example, used to navigate to any application in a set of applications that are executed on device 100. In some embodiments, menu button 104 includes a fingerprint sensor that identifies a fingerprint on menu button 104. The fingerprint sensor may be used to determine whether a finger on menu button 104 has a fingerprint that matches a fingerprint stored for unlocking device 100. Alternatively, in some embodiments, menu button 104 is implemented as a soft key in a graphical user interface (GUI) displayed on a touch screen.

In some embodiments, device 100 includes touch screen 150, menu button 104, push button 106 for powering the device on/off and locking the device, volume adjustment buttons 108, Subscriber Identity Module (SIM) card slot 110, head set jack 112, and docking/charging external port 124. Push button 106 may be used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. The device 100 includes various components including, but not limited to, a memory (which may include one or more computer readable storage mediums), a memory controller, one or more central processing units (CPUs), a peripherals interface, an RF circuitry, an audio circuitry, speaker 111, microphone 113, input/output (I/O) subsystem, and other input or control devices. Device 100 may include one or more image sensors 164, one or more proximity sensors 166, and one or more accelerometers 168. The device 100 may include components not shown in FIG. 1.

Device 100 is only one example of an electronic device, and device 100 may have more or fewer components than listed above, some of which may be combined into a components or have a different configuration or arrangement. The various components of device 100 listed above are embodied in hardware, software, firmware or a combination thereof, including one or more signal processing and/or application specific integrated circuits (ASICs).

Figure 2:
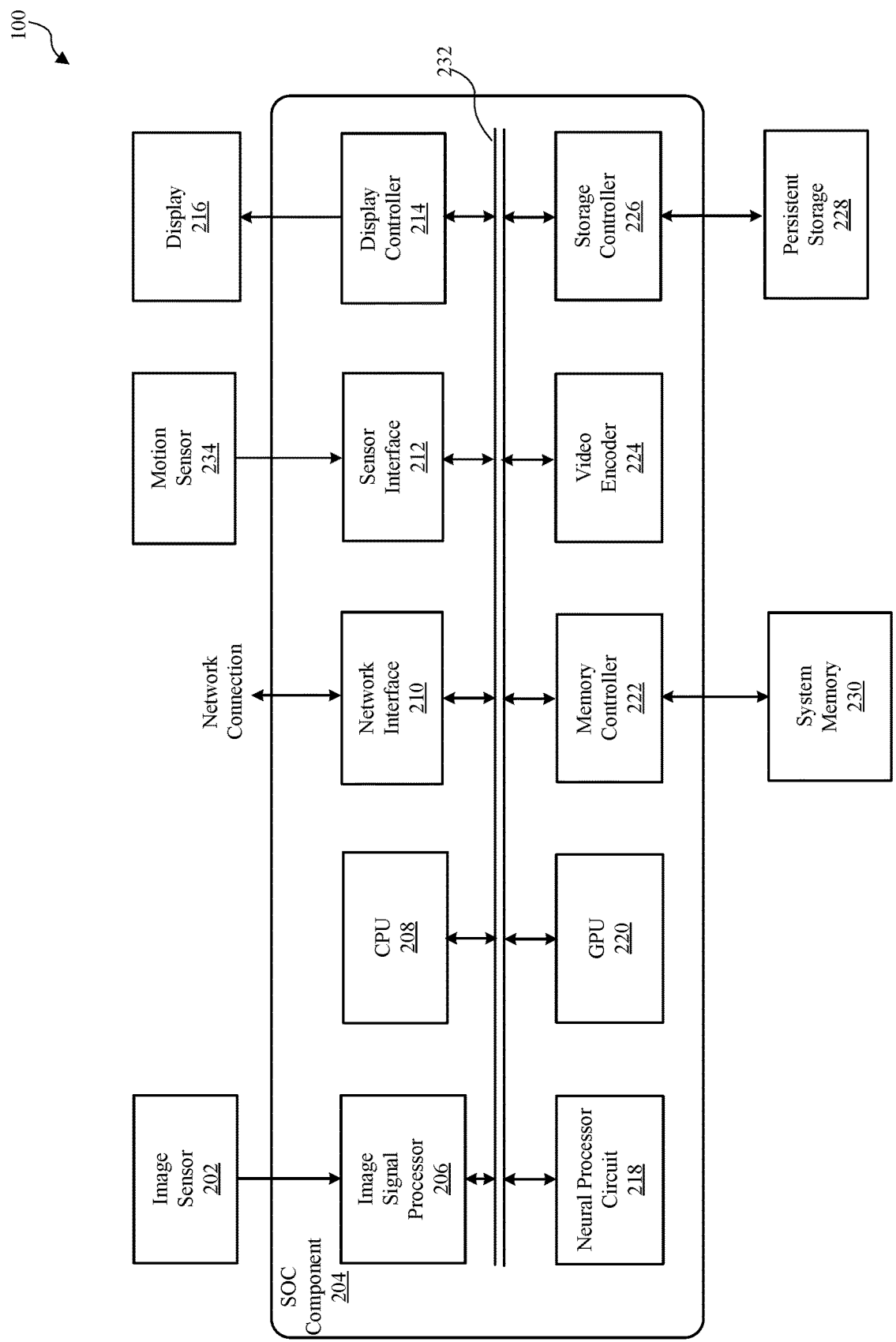
FIG. 2 is a block diagram illustrating components in the electronic device, according to one embodiment.

FIG. 2 is a block diagram illustrating components in device 100, according to one embodiment. Device 100 may perform various operations including image processing. For this and other purposes, the device 100 may include, among other components, image sensor 202, system-on-a chip (SOC) component 204, system memory 230, persistent storage (e.g., flash memory) 228, orientation sensor 234, and display 216. The components as illustrated in FIG. 2 are merely illustrative. For example, device 100 may include other components (such as speaker or microphone) that are not illustrated in FIG. 2. Further, some components (such as orientation sensor 234) may be omitted from device 100.

Image sensor 202 is a component for capturing image data and may be embodied, for example, as a complementary metal-oxide-semiconductor (CMOS) active-pixel sensor) a camera, video camera, or other devices. Image sensor 202 generates raw image data that is sent to SOC component 204 for further processing. In some embodiments, the image data processed by SOC component 204 is displayed on display 216, stored in system memory 230, persistent storage 228 or sent to a remote computing device via network connection. The raw image data generated by image sensor 202 may be in a Bayer color kernel array (CFA) pattern (hereinafter also referred to as "Bayer pattern").

Motion sensor 234 is a component or a set of components for sensing motion of device 100. Motion sensor 234 may generate sensor signals indicative of orientation and/or acceleration of device 100. The sensor signals are sent to SOC component 204 for various operations such as turning on device 100 or rotating images displayed on display 216.

Display 216 is a component for displaying images as generated by SOC component 204. Display 216 may include, for example, liquid crystal display (LCD) device or an organic light emitting diode (OLED) device. Based on data received from SOC component 204, display 216 may display various images, such as menus, selected operating parameters, images captured by image sensor 202 and processed by SOC component 204, and/or other information received from a user interface of device 100 (not shown).

System memory 230 is a component for storing instructions for execution by SOC component 204 and for storing data processed by SOC component 204. System memory 230 may be embodied as any type of memory including, for example, dynamic random access memory (DRAM), synchronous DRAM (SDRAM), double data rate (DDR, DDR2, DDR3, etc.) RAIVIBUS DRAM (RDRAM), static RAM (SRAM) or a combination thereof. In some embodiments, system memory 230 may store pixel data or other image data or statistics in various formats.

Persistent storage 228 is a component for storing data in a non-volatile manner. Persistent storage 228 retains data even when power is not available. Persistent storage 228 may be embodied as read-only memory (ROM), flash memory or other non-volatile random access memory devices.

SOC component 204 is embodied as one or more integrated circuit (IC) chip and performs various data processing processes. SOC component 204 may include, among other subcomponents, image signal processor (ISP) 206, a central processor unit (CPU) 208, a network interface 210, sensor interface 212, display controller 214, neural processor circuit 218, graphics processor (GPU) 220, memory controller 222, video encoder 224, storage controller 226, and bus 232 connecting these subcomponents. SOC component 204 may include more or fewer subcomponents than those shown in FIG. 2.

ISP 206 is hardware that performs various stages of an image processing pipeline. In some embodiments, ISP 206 may receive raw image data from image sensor 202, and process the raw image data into a form that is usable by other subcomponents of SOC component 204 or components of device 100. ISP 206 may perform various image-manipulation operations such as image translation operations, horizontal and vertical scaling, color space conversion and/or image stabilization transformations, as described below in detail with reference to FIG. 3.

CPU 208 may be embodied using any suitable instruction set architecture, and may be configured to execute instructions defined in that instruction set architecture. CPU 208 may be general-purpose or embedded processors using any of a variety of instruction set architectures (ISAs), such as the x86, PowerPC, SPARC, RISC, ARM or MIPS ISAs, or any other suitable ISA. Although a single CPU is illustrated in FIG. 2, SOC component 204 may include multiple CPUs. In multiprocessor systems, each of the CPUs may commonly, but not necessarily, implement the same ISA.

Graphics processing unit (GPU) 220 is graphics processing circuitry for performing graphical data. For example, GPU 220 may render objects to be displayed into a frame buffer (e.g., one that includes pixel data for an entire frame). GPU 220 may include one or more graphics processors that may execute graphics software to perform a part or all of the graphics operation, or hardware acceleration of certain graphics operations.

Neural processor circuit 218 is a circuit that performs various machine learning operations based on computations including multiplication, adding and accumulation. Such computations may be arranged to perform, for example, convolution of input data and kernel data. Neural processor circuit 218 is a configurable circuit that performs these operations in a fast and power-efficient manner while relieving CPU 208 of resource-intensive operations associated with neural network operations. Neural processor circuit 218 may receive the input data from sensor interface 302, the image signal processor 206, system memory 230 or other sources such as network interface 210 or GPU 220. The output of neural processor circuit 218 may be provided to various components of device 100 such as the image signal processor 206, system memory 230 or CPU 208 for various operations. The structure and operation of neural processor circuit 218 is described below in detail with reference to FIG. 3.

Network interface 210 is a subcomponent that enables data to be exchanged between devices 100 and other devices via one or more networks (e.g., carrier or agent devices). For example, video or other image data may be received from other devices via network interface 210 and be stored in system memory 230 for subsequent processing (e.g., via a back-end interface to image signal processor 206, such as discussed below in FIG. 3) and display. The networks may include, but are not limited to, Local Area Networks (LANs) (e.g., an Ethernet or corporate network) and Wide Area Networks (WANs). The image data received via network interface 210 may undergo image processing processes by ISP 206.

Sensor interface 212 is circuitry for interfacing with motion sensor 234. Sensor interface 212 receives sensor information from motion sensor 234 and processes the sensor information to determine the orientation or movement of the device 100.

Display controller 214 is circuitry for sending image data to be displayed on display 216. Display controller 214 receives the image data from ISP 206, CPU 208, graphic processor or system memory 230 and processes the image data into a format suitable for display on display 216.

Memory controller 222 is circuitry for communicating with system memory 230. Memory controller 222 may read data from system memory 230 for processing by ISP 206, CPU 208, GPU 220 or other subcomponents of SOC component 204. Memory controller 222 may also write data to system memory 230 received from various subcomponents of SOC component 204.

Video encoder 224 is hardware, software, firmware or a combination thereof for encoding video data into a format suitable for storing in persistent storage 228 or for passing the data to network interface 210 for transmission over a network to another device.

In some embodiments, one or more subcomponents of SOC component 204 or some functionality of these subcomponents may be performed by software components executed on ISP 206, CPU 208 or GPU 220. Such software components may be stored in system memory 230, persistent storage 228 or another device communicating with device 100 via network interface 210.

Image data or video data may flow through various data paths within SOC component 204. In one example, raw image data may be generated from the image sensor 202 and processed by ISP 206, and then sent to system memory 230 via bus 232 and memory controller 222. After the image data is stored in system memory 230, it may be accessed by video encoder 224 for encoding or by display 116 for displaying via bus 232.

Example Neural Processor Circuit

Neural processor circuit 218 is a configurable circuit that performs neural network operations on the input data based at least on kernel data 340. For this purpose, neural processor circuit 218 may include, among other components, neural task manager 310, a plurality of neural engines 314A through 314N (hereinafter collectively referred as "neural engines 314" and individually also referred to as "neural engine 314"), kernel direct memory access (DMA) 324, data buffer 318 and buffer DMA 320. Neural processor circuit 218 may include other components not illustrated in FIG. 3.

Each of neural engines 314 performs computing operations for neural network operations in parallel. Depending on the load of operation, entire set of neural engines 314 may be operated or only a subset of the neural engines 314 may be operated while the remaining neural engines 314 are placed in a power save mode to conserve power. Each of neural engines 314 includes components for storing one or more kernels, for performing multiply-accumulate operations, and for post-processing to generate an output data 328, as described below in detail with reference to FIG. 4. One example of a neural network operation is a convolution operation.

Figure 3:
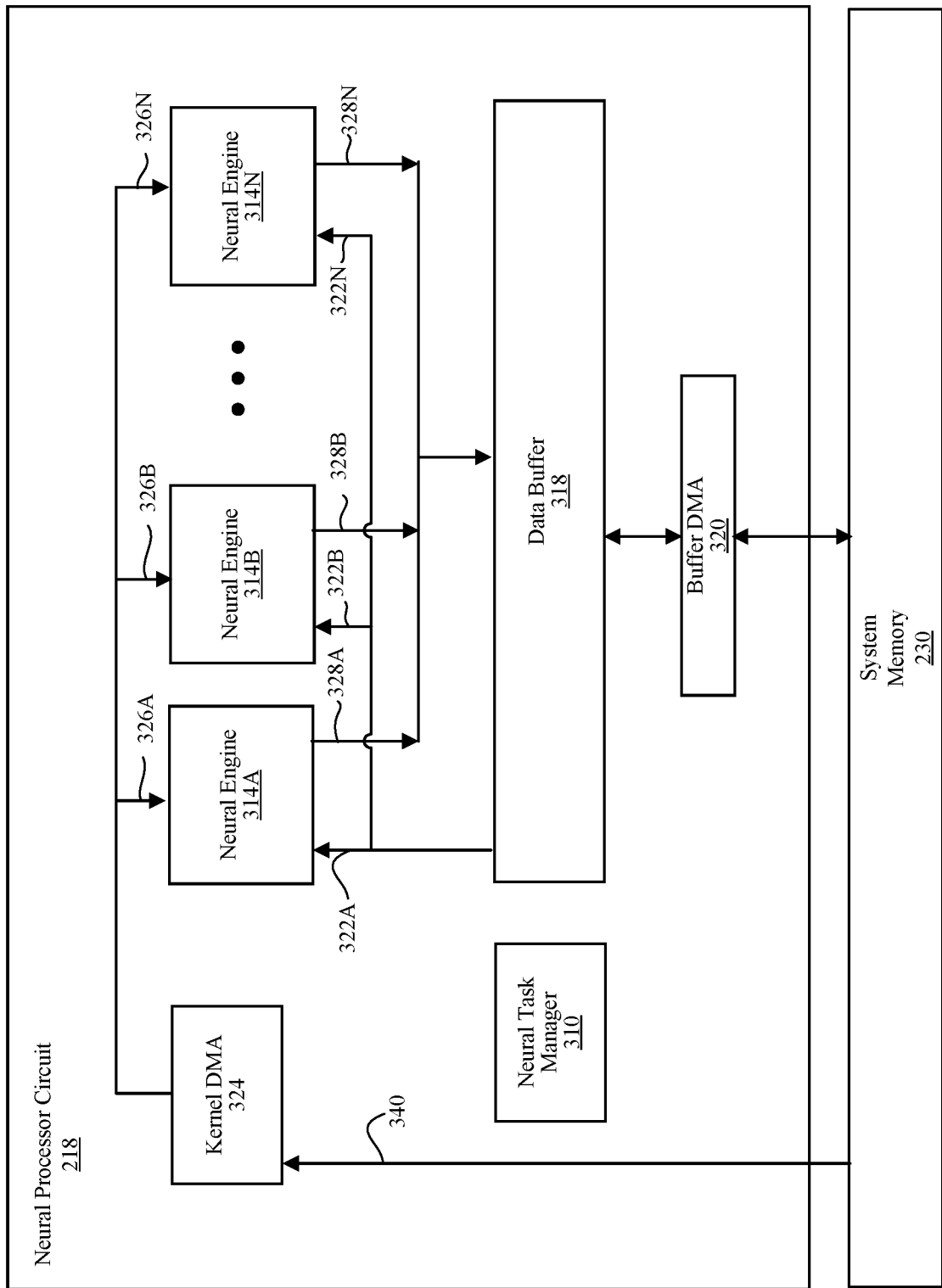
FIG. 3 is a block diagram illustrating a neural processor circuit, according to one embodiment.

Neural task manager 310 manages the overall operation of neural processor circuit 218. Neural task manager 310 may receive a task list from a compiler executed by CPU 208, store tasks in its task queues, choose a task to perform, and send instructions to other components of the neural processor circuit 218 for performing the chosen task. Neural task manager 310 may also perform switching of tasks on detection of events such as receiving instructions from CPU 208. In one or more embodiments, the neural task manager 310 sends rasterizer information to the components of the neural processor circuit 218 to enable each of the components to track, retrieve or process appropriate portions of the input data and kernel data, as described below in detail with reference to FIGS. 5 through 7. Although neural task manager 310 is illustrated in FIG. 3 as part of neural processor circuit 218, neural task manager 310 may be a component outside the neural processor circuit 218.

Kernel DMA 324 is a read circuit that fetches kernel data from a source (e.g., system memory 230) and sends kernel data 326A through 326N to each of the neural engines 314. Kernel data represents information from which kernel elements can be extracted. In one embodiment, the kernel data may be in a compressed format which is decompressed at each of neural engines 314. Although kernel data provided to each of neural engines 314 may be the same in some instances, the kernel data provided to each of neural engines 314 is different in most instances.

Data buffer 318 is a temporary storage for storing data associated with the neural network operations. In one embodiment, data buffer 318 is embodied as a memory that can be accessed by all of the neural engines 314. Data buffer 318 may store input data 322A through 322N for feeding to corresponding neural engines 314A through 314N, as well as output from each of neural engines 314A through 314N for feeding back into neural engines 314 or sending to a target circuit (e.g., system memory 230). The operations of data buffer 318 and other components of the neural processor circuit 218 are coordinated so that the input data and intermediate data stored in the data buffer 318 is reused across multiple operations at the neural engines 314, and thereby reduce data transfer to and from system memory 230. Data buffer 318 may be operated in a broadcast mode where data input data of all input channels are fed to all neural engines 314 or in a unicast mode where data input data of a subset of input channels are fed to each neural engine 314.

The input data 322 stored in data buffer 318 may be part of, among others, image data, histogram of oriented gradients (HOG) data, audio data, meta data, output data 328 of a previous cycle of the neural engine 314, and other processed data received from other components of the SOC component 204. Further, input data 322 may refer to all of the data stored in data buffer 318 or one or more portions of the input data stored in data buffer 318.

Buffer DMA 320 includes a read circuit that receives a portion (e.g., tile) of the input data from a source (e.g., system memory 230) for storing in data buffer 318, and a write circuit that forwards data from data buffer 138 to a target (e.g., system memory).

Example Neural Engine Architecture

Figure 4:
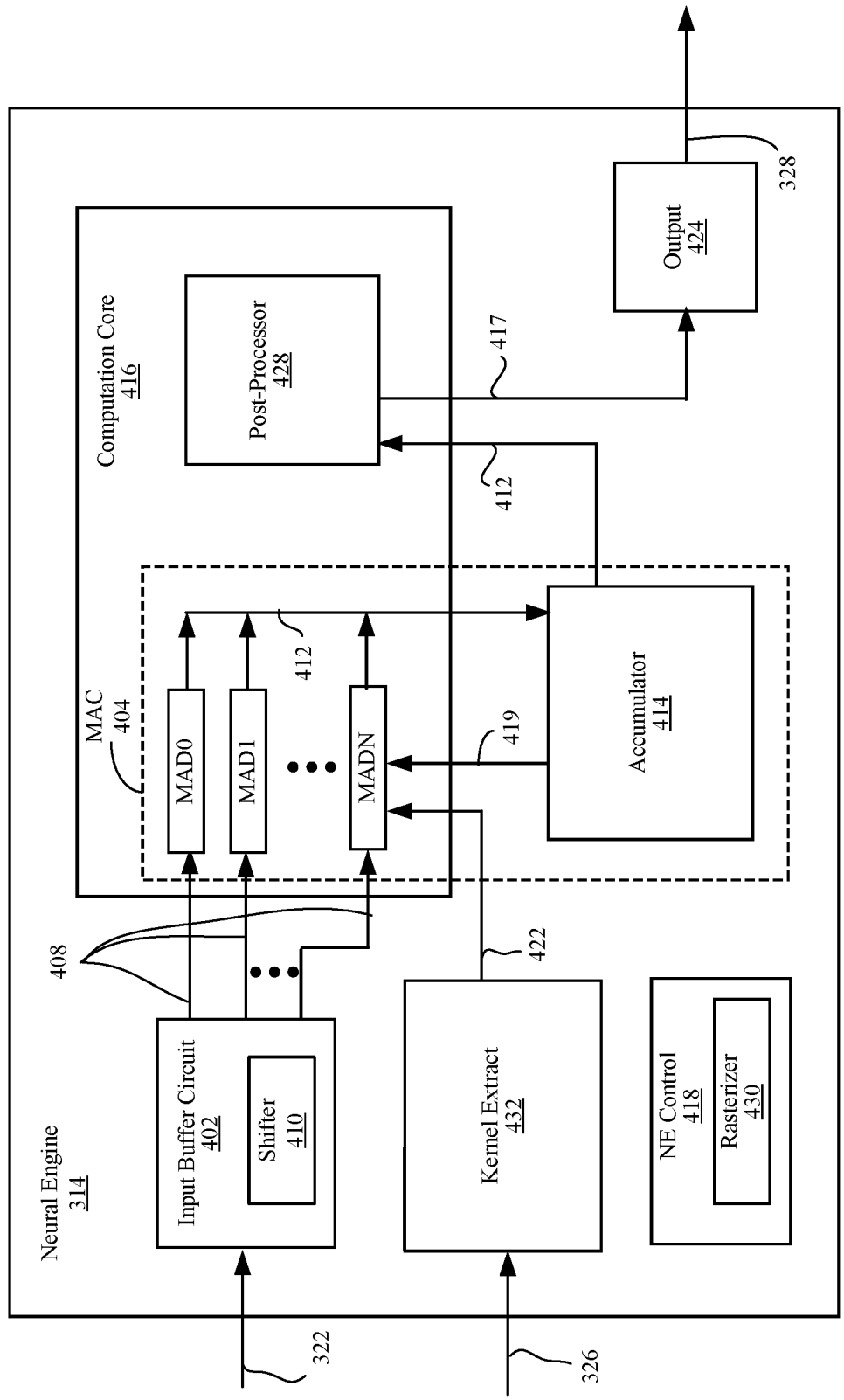
FIG. 4 is a block diagram of a neural engine in the neural processor circuit, according to one embodiment.

FIG. 4 is a block diagram of the neural engine 314, according to one embodiment. The neural engine 314 performs various operations to facilitate neural network operations such as convolution, spatial pooling and local response normalization. The neural engine 314 receives the input data 322, performs multiply-accumulate operations (e.g., convolution operations) on the input data 322 based on stored kernel data, performs further post-processing operations on the result of the multiply-accumulate operations, and generates the output data 328. The input data 322 and/or the output data 328 of the neural engine 314 may be of a single channel or multiple channels.

Neural engine 314 may include, among other components, input buffer circuit 402, computation core 416, neural engine (NE) control 418, kernel extract circuit 432, accumulators 414 and output circuit 424. Neural engine 314 may include further components not illustrated in FIG. 4.

Input buffer circuit 402 is a circuit that stores a portion of the input data 322 as it is received from the data buffer 318 and sends an appropriate portion 408 of input data for a current task or process loop to computation core 416 for processing. Input buffer circuit 402 includes a shifter 410 that shifts read locations of input buffer circuit 402 to change the portion 408 of input data sent to computation core 416. By changing portions of input data provided to the computation core 416 via shifting, neural engine 314 can perform multiply-accumulate for different portions of input data based on fewer number of read operations. In one or more embodiments, the input data 322 includes data of difference convolution groups and/or input channels.

Kernel extract circuit 432 is a circuit that receives kernel data 326 from kernel DMA 324 and extracts kernel coefficients 422. In one embodiment, the kernel extract circuit 432 references a look up table (LUT) and uses a mask to reconstruct a kernel from compressed kernel data 326. The mask indicates locations in the reconstructed kernel to be padded with zero and remaining locations to be filled with numbers. The kernel coefficients 422 of the reconstructed kernel are sent to computation core 416 to populate register in multiply-add (MAD) circuits of computation core 416. In other embodiments, the kernel extract circuit 432 receives kernel data in an uncompressed format and the kernel coefficients are determined without referencing a LUT or using a mask.

Computation core 416 is a programmable circuit that performs computation operations. For this purpose, the computation core 416 may include MAD circuits MAD0 through MADN and a post-processor 428. Each of MAD circuits MAD0 through MADN may store an input value in the portion 408 of the input data and a corresponding kernel coefficient in the kernel coefficients 422. The input value and the corresponding kernel coefficient are multiplied in each of MAD circuits to generate a processed value 412.

Accumulator 414 is a memory circuit that receives and stores processed values 412 from MAD circuits. The processed values stored in accumulator 414 may be sent back as feedback information 419 for further multiply and add operations at MAD circuits or sent to post-processor 428 for post-processing. Accumulator 414 in combination with MAD circuits form a multiply-accumulator (MAC) 404. In one or more embodiments, accumulator 414 may have subunits where each subunit sends data to different components of neural engine 314. For example, during a processing cycle, data stored in a first subunit of accumulator 414 is sent to MAC circuit while data stored in a second subunit of accumulator 414 is sent to post-processor 428.

Post-processor 428 is a circuit that performs further processing of values 412 received from accumulator 414. The post-processor 428 may perform operations including, but not limited to, applying linear functions (e.g., Rectified Linear Unit (ReLU)), normalized cross-correlation (NCC), merging the results of performing neural operations on 8-bit data into 16-bit data, and local response normalization (LRN). The result of such operations is output from the post-processor 428 as processed values 417 to output circuit 424.

NE control 418 controls operations of other components of the neural engine 314 based on the operation modes and parameters of neural processor circuit 218. Depending on different modes of operation (e.g., group convolution mode or non-group convolution mode) or parameters (e.g., the number of input channels and the number of output channels), neural engine 314 may operate on different input data in different sequences, return different values from accumulator 414 to MAD circuits, and perform different types of post-processing operations at post processor 428. To configure components of the neural engine 314 to operate in a desired manner, the NE control 418 sends control signal to components of the neural engine. NE control 418 may also include rasterizer 430 that tracks the current task or process loop being processed at neural engine 314, as described below in detail with reference to FIG. 5 through 7.

Output circuit 424 receives processed values 417 from the post-processor 428 and interfaces with data buffer 318 to store processed values 417 in data buffer 318. For this purpose, output circuit 424 may send out output data 328 in a sequence or a format that is different from the sequence or format in which the processed values 417 are processed in post-processor 428.

The components in the neural engine 314 may be configured during a configuration period by the NE control 418 and the neural task manager 310. For this purpose, the neural task manager 310 sends configuration information to the neural engine 314 during the configuration period. The configurable parameters and modes may include, but are not limited to, mapping between input data elements and kernel elements, the number of input channels, the number of output channels, performing of output strides, and enabling/selection of post-processing operations at the post processor 428.
Operation of Segmenting of Data for Processing at Neural Processor Circuit Input data is typically split into smaller pieces of data for parallel processing at multiple neural engines 314. Often multiple cycles of operations are performed to generate output for a task associated with a neural network. A compiler executed by CPU 208 analyzes the hierarchy and nodes of the neural network and determines how the input data is to be segmented based on the hardware constraints of the neural processor circuit 218. One of functions of the compiler is to determine how input data is to be split into smaller data units for processing at the neural engines 314, and how the processing is to be iterated in loops to produce the result for tasks.

Figure 5:
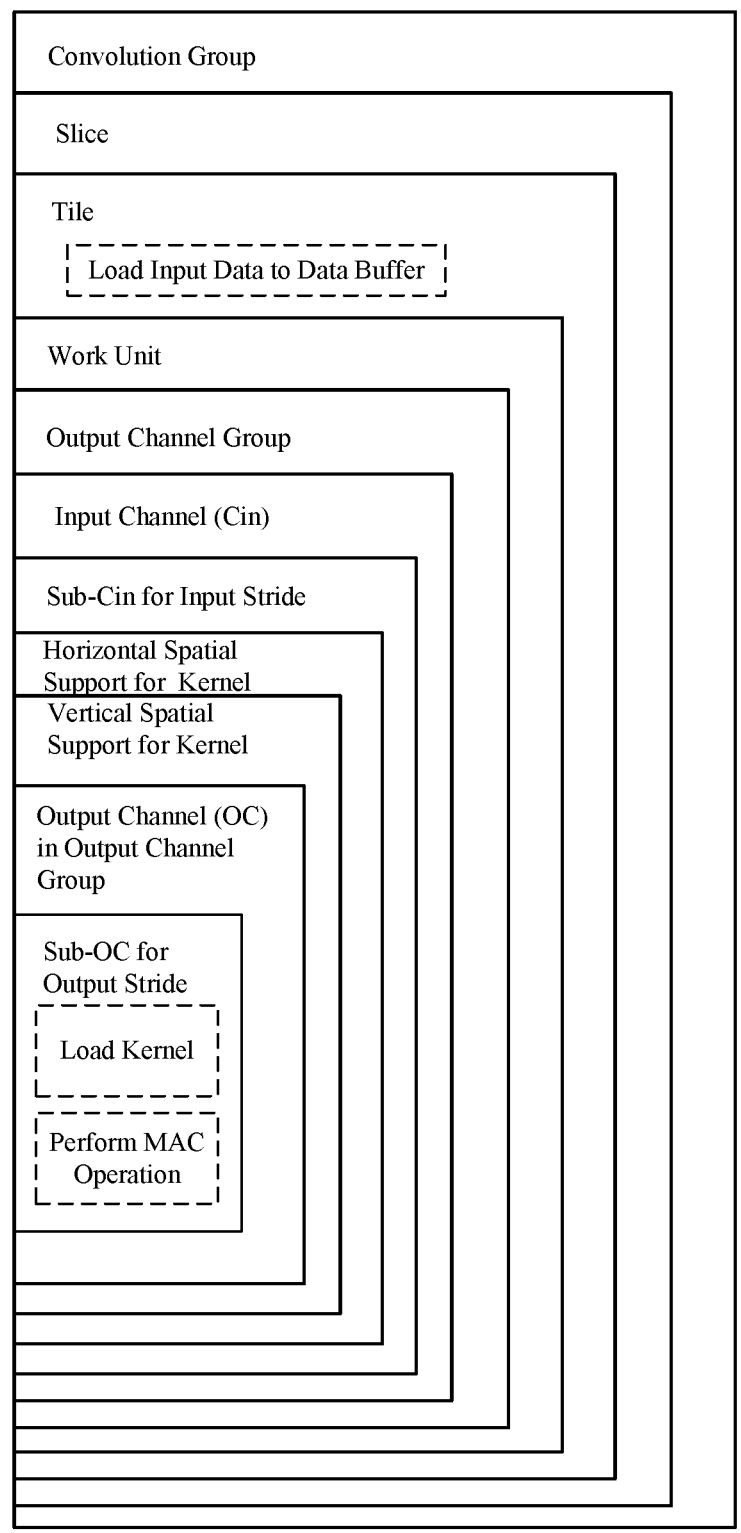
FIG. 5 is a conceptual diagram illustrating loops for processing input data at the neural processor circuit, according to one embodiment.

FIG. 5 is a conceptual diagram illustrating loops for processing the input data at neural processor circuit 218, according to one embodiment. The outermost loop represents processing for a convolution group, if group convolution involving multiple convolution group is used. Group convolutions are convolutions where input data of the input channels in each group are used only for generating output data of output channels of each group but are not used for generating output data for output channels of other groups. Hence, each group of the group convolution can be treated as a separate convolution operation.

Figure 6:
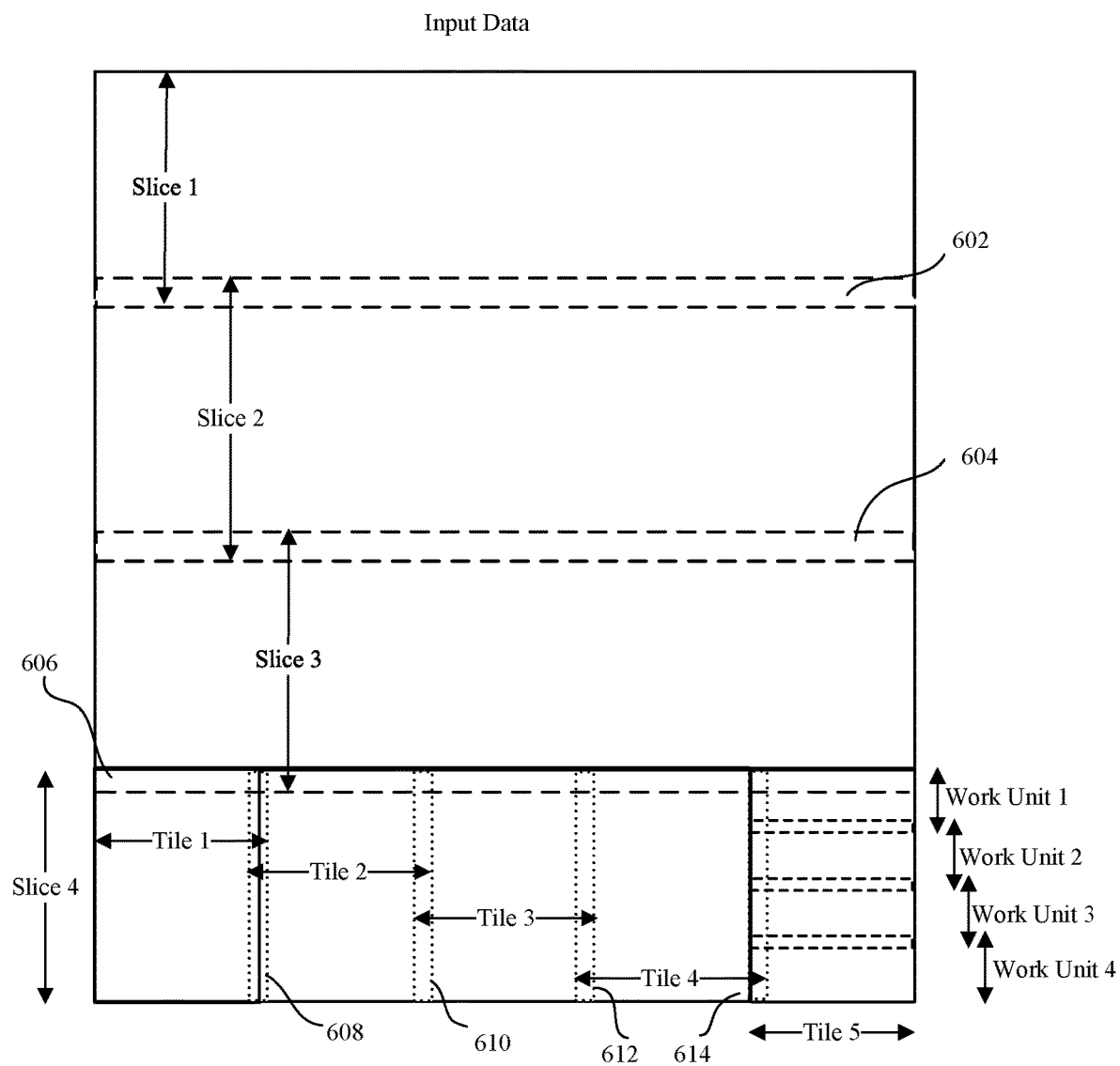
FIG. 6 is a conceptual diagram illustrating segmenting the input data into slices, tiles and work units, according to one embodiment.

In the loop for each convolution group is a processing loop for a slice of the input data. The entire input data for a convolution operation is segmented into multiple strips of slices in an overlapping manner, as shown in FIG. 6. The overlapping portions 602, 604, 606 are parts of the input data that are overfetched in two adjacent slices to provide spatial support for a corresponding kernel. The second outermost loop performs convolution operation for each slice in the input data. Within the loop for a slice is a processing loop for a tile of the slice. Each slice is segmented into a plurality of tiles, as shown in FIG. 6. The overlapping portions 608, 610, 612, 614 are parts of the input data in slice 4 that are overfetched in two adjacent tiles to provide spatial support for a corresponding kernel. The rightmost tile will typically have a width smaller than other tiles of the slice. In one embodiment, input data for each tile is loaded onto data buffer 318 in a read cycle and reused for operations in processing loops for the tile. In the processing loop for the tile is a processing loop for a work unit. Each tile is segmented into multiple work units as shown in FIG. 6. A work unit is a portion of the input data having a size that produces output values that fit into accumulator 414 of neural engine 314 during a single cycle of the computation core 416. Although the shape of each work unit is shown as a horizontal strip in FIG. 6, the shape of the work unit can be different depending on the shape and size of the tile. The work units also have overlapping parts that represent overfetched to provide support for a corresponding kernel. Especially, work units for the last tile of a slice may have a shape of a vertical strip if the tile is tall. In one or more embodiments, the size of each work unit is 256 bytes. In such embodiments, for example, work units can be shaped to one of 16×16, 32×8, 64×4, 128×2 or 256×1 dimension.

For each work unit, an internal processing loop may be provided for an output channel group (OCG). The number of output channels produced for a given work unit by a single cycle of the computation core 416 is referred to as an OCG. Depending on operation modes, each neural engine 314 may process output data of different numbers of output channels (e.g., 8 channels, 32 channels) for a single load of input data into its input buffer circuit 402.

For each output channel group, an internal processing loop may be provided for an input channel (Cin). If an input stride is implemented to skip certain input data, loops for sub-input channels (Sub-Cin) may be provided within the processing loop for the input channel (Cin).

For each input channel or each sub-input channel, internal loops are provided for processing horizontal spatial support for a kernel and the vertical support within each horizontal spatial support. The spatial support refers to the input data for convolution with the kernel, and includes overfetched input data for performing convolution at the edges of the input data.

Overfetch refers to fetching additional input data in current slice, tile or work unit so that proper dimension of input data can be provided for convolution with a kernel. In one or more embodiments, overfetch is performed vertically between slices to obtain additional rows of input data (shown as overlapping portions 602, 604, 606 in FIG. 6), horizontally between tiles to obtain additional columns of input data (shown as overlapping portions 608, 606, 612, 614 in FIG. 6), and vertically between work units within a tile to obtain additional rows of input data.

For each spatial support for the kernel, an internal processing loop for an output channel (OC) is provided to generate output data for each output channel (Cout). In cases where output stride implements a spatial upsampling, an additional inner loop for processing each sub-output channel is provided. Loading of kernel coefficients and MAC operations are performed within the loop for the output channel (OC) or sub-output channel if an output stride is implemented, to generate output data for the output channel (OC) or sub-output channel.

The nested loop structure of FIG. 5 is merely illustrative. Loops may be omitted, added or structured differently depending on various factors. For example, if only a single convolution group is used, the outermost loop may be removed. Further, the loop structure for the horizontal spatial support and the vertical spatial support may be reversed.

In one or more embodiments, the operations associated dividing the input space into smaller units and processing these smaller units as described above with reference to FIGS. 5 and 6 are performed by rasterizers 714, 718, 720, 722 in various components of neural processor circuit 218. A rasterizer is a circuit in various components of neural processor circuit 218 that keeps track of the segment of the input/output data (e.g., group, work unit, input channel, output channel) and instructs the components of neural processor circuit for proper handling of the segment of the input data. For example, rasterizer 720 in buffer DMA 320 tracks tiles and slices received from system memory 230 while rasterizer 718 in data buffer 318 broadcasts in sequence work units for processing by the neural engines 314. Rasterizer 724 in kernel DMA 324 determines which kernels are to be received and distributed to neural engines 314, while rasterizers 714 in neural engines 314 operate shifters 410 in input buffer circuits 402 to forward correct portions 408 of input data to MAC 404, and send the finished output data 328 to the data buffer 318.

Figure 7:
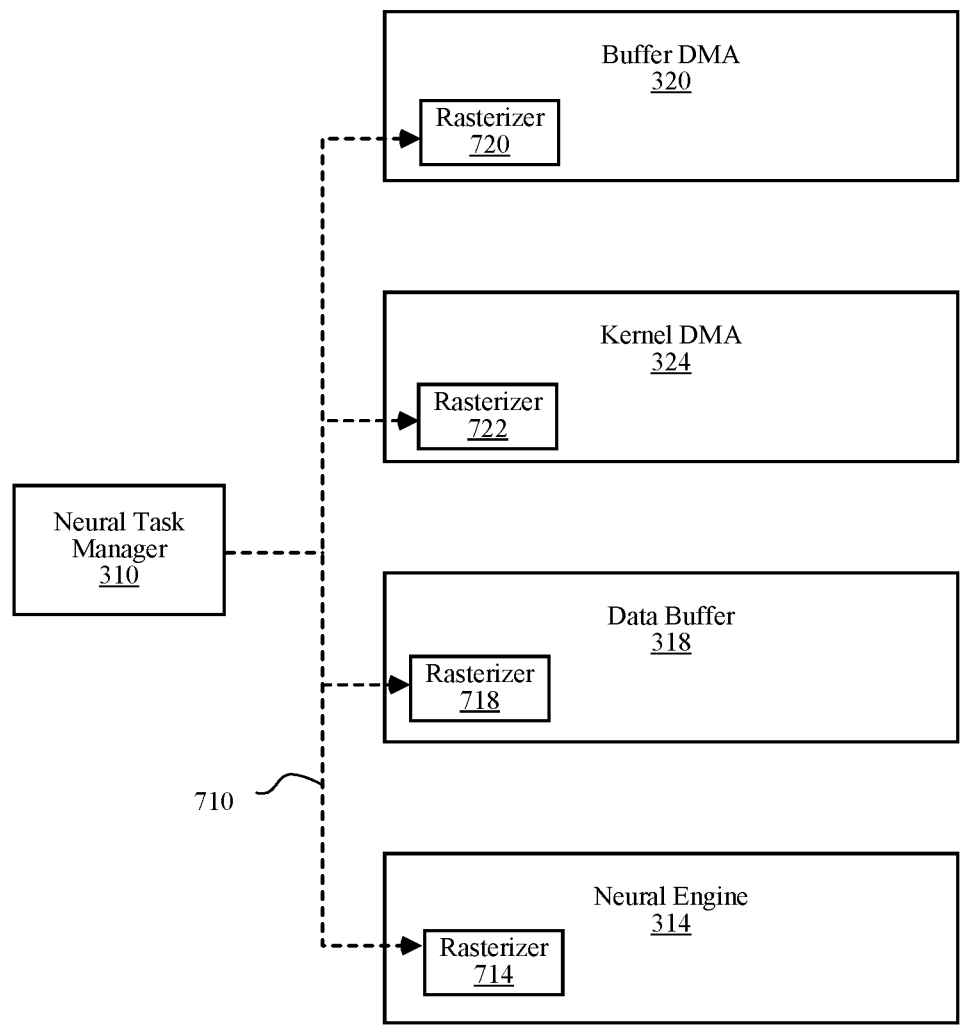
FIG. 7 is a diagram illustrating programming of rasterizers in components of the neural processor circuit, according to one embodiment.

FIG. 7 is a diagram illustrating programming of rasterizers 714, 718, 720, 722 in components 314, 318, 320, 322 of the neural processor circuit 218, according to one embodiment. To perform their functions, each of rasterizers 714, 718, 720, 722 receives task information 710 indicating how the input data and/or kernel data are to be segmented and to be handled by each component of the neural processor circuit 218. The task information includes information about particulars of the current layer (e.g., dimensions of input and output data, dimension of an associated kernel, types of padding at the boundaries of input data). Rasterizers 714, 718, 720, 722 may also receive constraints on their operations (e.g., whether to allow or disallow tile width over a threshold).

By providing rasterizers in different components of neural processor circuit 218, overhead in data transmitted between the components of the neural processor circuit 218 may be reduced. If a single central rasterizer is provided to control different components of the neural processor circuit 218, kernel data, input data, and output data transmitted between the components may be needed in these data to identify associated position in the loops of the task such as convolution group, tile, slice, work unit, input channel and output channel. By using distributed rasterizers, no separate metadata is needed to transmit the kernel data, input data and output data among components of the neural processor circuit 218.

Example Process at Neural Engine Architecture

Figure 8:
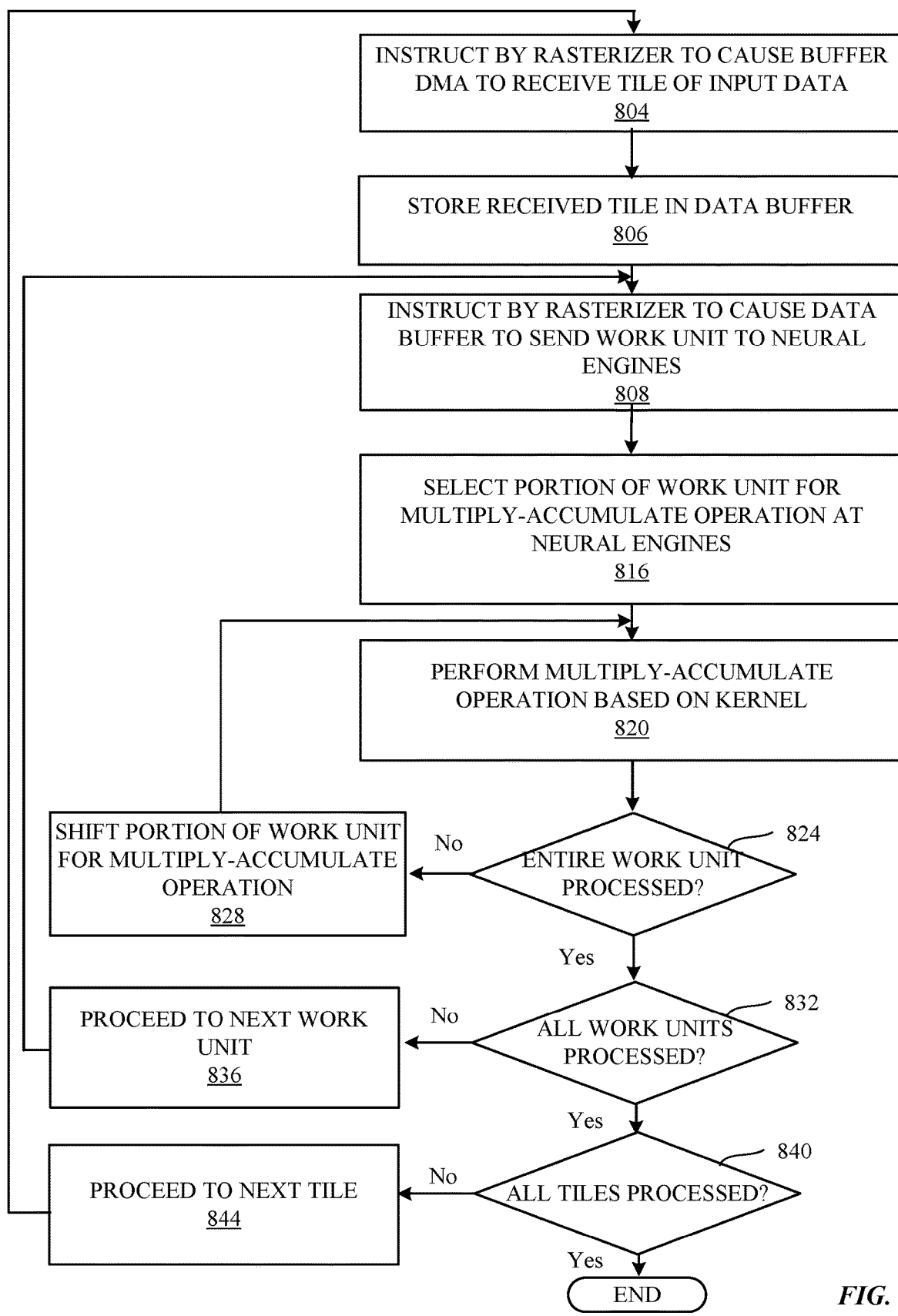
FIG. 8 is a flowchart illustrating a method of processing input data in a neural processor circuit, according to one embodiment.

FIG. 8 is a flowchart illustrating a method of processing input data in neural processor circuit 218, according to one embodiment. After neural task manager 310 programs rasterizers 714, 718, 720, 722, the process of operating buffer DMA 320 is initiated by rasterizer 720 instructing 804 buffer DMA 320 to cause buffer DMA 320 to receive a tile of input data from system memory 230. The tile received by buffer DMA 320 is stored 806 in data buffer 318.

Rasterizer 718 in data buffer 318 then instructs 808 data buffer 318 to send a work unit to one or more neural engines 314. The work unit is then stored in input buffer circuits 402 of the one or more neural engines 314.

In one or more embodiments, input buffer circuit 402 selects 816 a portion of work unit to be sent to MAC 404 to perform multiply-accumulate operation. Then MAC 404 performs 820 multiply-accumulate operations on the selected portion of the work unit using a corresponding kernel. Then it is determined 824 if the entire work unit is processed at one or more neural engines 314. If not, the selected portion of the work unit is shifted 828 by shifter 410 and returns to perform 820 another round of multiply-accumulate operations.

If it is determined 824 that the entire work unit was processed, then it proceeds to determine 832 if all work units in the tile was processed. If not, then the process proceeds 836 to the next work unit by having data buffer 318 send 808 a next work unit to one or more neural engines 314, and repeats the subsequent processes.

If it is determined 832 that all work units in the tile was processed by the neural engines 314, the process proceeds to determine 840 whether all tiles for the input data were processed. If not, the process proceeds 844 to a next tile by having rasterizer 720 instructs 804 buffer DMA 320 to receive a next tile from system memory 230 and repeats the subsequent processes.

If it is determined 840 that all tiles of the input data are processed, then the process ends for the current input data. Then, the process may repeated to process the next input data or proceed to the next task.

Embodiments of the process as described above with reference to FIG. 8 are merely illustrative. Further loops may be embodied, as described above with reference to FIG. 5. Moreover, sequence of the process may be modified or omitted.

Matrix Multiplication Operations as Convolution

Matrix-vector multiplication is a common operation in machine learning and computer vision applications. Neural processor circuit 218 may accelerate execution of the matrix-vector multiplication if the matrix-vector multiplication is formulated as a convolution operation (i.e., multiple multiply-accumulate operations) on at least a work unit of input data 322 and kernel data 326.

Figure 9A:
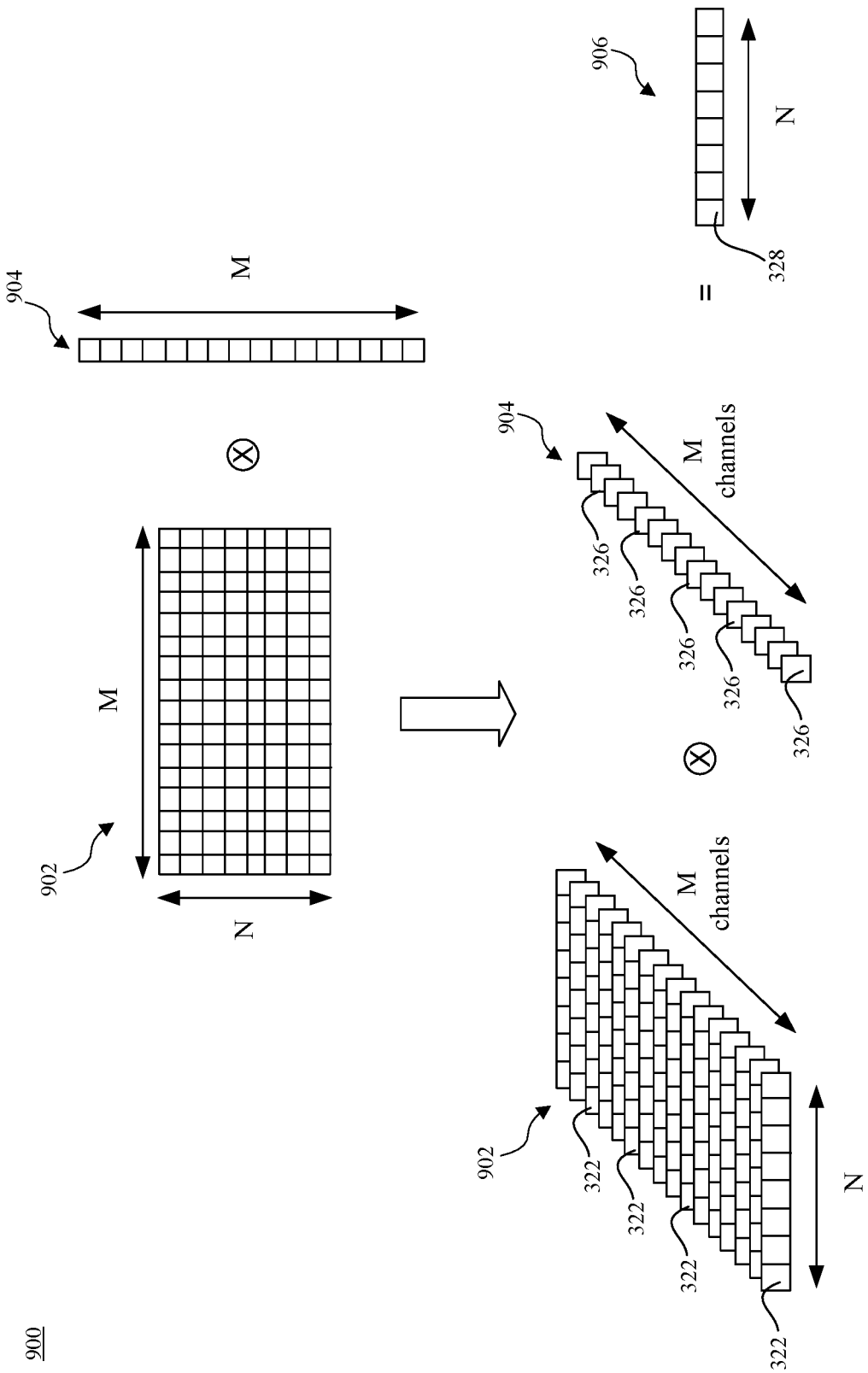
FIG. 9A is a conceptual diagram illustrating matrix-vector multiplication performed as a convolution by a neural processor circuit, according to one embodiment.

FIG. 9A is a conceptual diagram 900 illustrating matrix-vector multiplication performed as a convolution by neural processor circuit 218, according to one embodiment. In the illustrative embodiment shown in FIG. 9A, the matrix-vector multiplication is performed between a matrix 902 having matrix elements organized in N rows and M columns and a vector 904 having M vector elements (M-dimensional vector). The matrix elements may be broadcast from data buffer 318 to neural processor circuit 218 as portion of input data 322. The vector elements may be sent, via kernel DMA 324 (kernel fetcher circuit), to neural processor circuit 218 as kernel data 326. As shown in FIG. 9A, the matrix elements of the matrix 902 can be reshaped into portion of input data 322 having spatial width of N, spatial height of one, and M channels. The vector 904 can be treated as 1×1 shaped kernel data 326 (i.e., a kernel coefficient) with M input channels and a single output channel. The neural processor circuit 218 can perform multiplication between the matrix 902 and the vector 904 as a convolution operation on M channels of N-dimensional portion of input data 322 and 1×1 kernel data 326. The result of convolution is a new N-dimensional vector 906, i.e., output data 328 having spatial width of N, spatial height of one, and one output channel.

The reshaping of matrix 902 shown in FIG. 9A can be achieved based on appropriate broadcasting of the matrix elements from data buffer 318 to neural engines 314 of neural processor circuit 218. At least one neural engine 314 may receive the matrix elements of the matrix 902 as at least the portion of input data 322 from data buffer 318 over multiple processing cycles. In an embodiment, each column of the matrix 902 can be broadcast as the N-dimensional portion of input data 322 from data buffer 318 to input buffer circuit 402 of neural engine 314 over one or more processing cycles, which may depend on a value of N and precision of matrix elements (e.g., floating point precision, integer precision, etc.). The N-dimensional portion of input data 322 representing a column of the matrix 902 may be provided to MAC 404 of neural engine 314 as portion 408 of input data.

The neural engine 314 may further receive, from the kernel DMA 324 (kernel fetcher circuit), vector elements of the vector 904 as kernel data 326. At least a portion of the vector elements of the vector 904 may be stored in kernel extract circuit 432. During each processing cycle, a different vector element may be extracted from kernel extract circuit 432 and provided as a corresponding kernel coefficient 422 to each of MAD circuits MAD0 through MADN of MAC 404.

Each of MAD circuits MAD0 through MADN of the MAC 404 in neural engine 314 may store an input value of portion 408 of input data (i.e., an element of the N-dimensional column of the matrix 902) and the corresponding kernel coefficient 422 (i.e., an element of the vector 904). During a processing cycle, each input value of portion 408 (i.e., each column element) and the corresponding kernel coefficient 422 (i.e., vector element) are multiplied in each of the MAD circuits MAD0 through MADN to generate processed values 412 for accumulation by accumulators 414. In one embodiment, input values of portion 408 of input data are floating point 16-bit numbers, and neural engine 314 is configured to operate in the convolution mode supporting floating point 16-bit operands (i.e., FP16 convolution mode). In FP16 convolution mode, MAC 404 may be configured to multiply (using MAD circuits MAD0 through MADN) 128 input values of portion 408 and two kernel coefficients 422 during the processing cycle. In another embodiment, input values of portion 408 of input data are 8-bit integers, and neural engine 314 is configured to operate in the convolution mode supporting 8-bit integer operands (i.e., INT8 convolution mode). In INT8 convolution mode, MAC 404 may be configured to multiply 256 input values of portion 408 and one kernel coefficient 422 during the processing cycle. Accumulators 414 may be configured for accumulation of 32-bit integer operands, i.e., accumulated processed values 412 may be 32-bit integers.

Over the multiple processing cycles, MAC 404 may perform multiply-accumulate operations for M channels of N-dimensional portion 408 of input data and M kernel coefficients 422 to produce processed values 412. Processed values 412 may be then post-processed by post-processor 428 and stored as processed values 417 in output circuit 424. Processed values 417 may be output from output circuit 424 and stored in data buffer 318 as a single channel of output data 328 having spatial width of N elements, i.e., the result of convolution is the N-dimensional vector 906. Therefore, neural engine 314 performs multiplication between the matrix 902 and the vector 902 as a convolution operation producing a single output channel of output data 328. Neural engine 314 performs, as part of the convolution operation, multiply-accumulate operations on a subset of the matrix elements corresponding to each column of the matrix 902 and on each of the vector elements of the vector 904 during each of the processing cycles.

Matrix-vector multiplication with bias is also a common operation in machine learning and computer vision applications. The matrix-vector multiplication with bias can be viewed and executed as an extension of matrix-vector multiplication without bias illustrated in FIG. 9A. The matrix-vector multiplication with bias can be defined as $$y = Ax + b = [A\ b]\begin{bmatrix}x\\1\end{bmatrix}, \quad (1)$$

where A is a matrix of elements organized in N rows and M columns, x is a M dimensional vector, b is a bias vector, and y is an output vector. As shown in equation (1), the bias factor b can be merged with the matrix A as an additional column, wherein the vector x also includes an additional element. Neural processor circuit 218 can utilize the approach defined in equation (1) to support matrix-vector multiplication with bias.

Figure 9B:
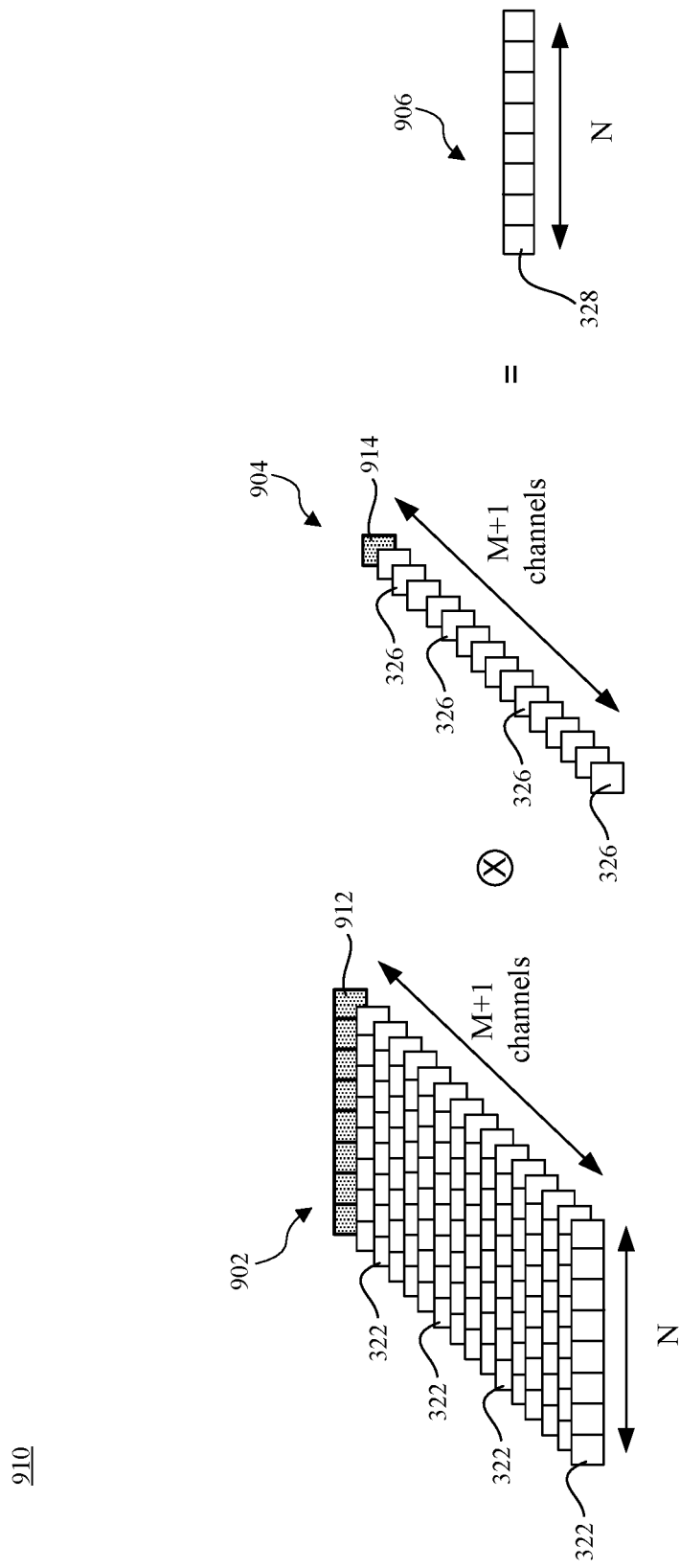
FIG. 9B is a conceptual diagram illustrating matrix-vector multiplication with bias performed as a convolution by a neural processor circuit, according to one embodiment.

FIG. 9B is a conceptual diagram 910 illustrating matrix-vector multiplication with bias performed as a convolution by neural processor circuit 218, according to one embodiment. Elements 912 of the bias vector b can be merged as an additional column into matrix 902 having now N rows and M+1 columns, which can be reshaped and broadcast from data buffer 318 as portion of input data 322 having spatial width of N, spatial height of one, and M+1 channels. Bias element 914 can be also merged as an additional element into vector 904, and vector 904 can be treated as 1×1 kernel data 326 with M+1 input channels and a single output channel. Similarly as for the matrix-vector multiplication without bias, at least one of the neural engines 314 can perform matrix-vector multiplication with bias as convolution on M+1 channels of N-dimensional portion of input data 322 and 1×1 kernel data 326. The result of convolution is the N-dimensional vector 906, i.e., output data 328 having spatial width of N, spatial height of one, and one output channel.

Neural engine 314 receives bias elements 912 from data buffer 318 as portion of input data 322, e.g., during at least one processing cycle. The data buffer 318 may broadcast bias elements 912 as N-dimensional portion of input data 322 into input buffer circuit 402 of the at least one neural engine 314. The N-dimensional portion of input data 322 representing bias elements 912 may be then provided as portion 408 of input data to MAC 404. Neural engine 314 may further extract, from kernel extract circuit 432 loaded by kernel DMA 324, bias element 914 as a corresponding kernel coefficient 422. The kernel coefficient 422 may be then provided to each of MAD circuits MAD0 through MADN of MAC 404. Portion 408 of input data (bias elements 912) and the kernel coefficient 422 (bias element 914) may be multiplied in each of the MAD circuits to generate processed values 412 for accumulation by accumulators 414. In one embodiment, bias element 914 (and the kernel coefficient 422) is set to a unit value, as defined in equation (1). In this case, the neural engine 314 may be configured to bypass extraction of the kernel coefficient 422 from kernel extract circuit 432 (and fetching of corresponding kernel data 326 by the kernel DMA 324), and to bypass multiplication in each of the MAD circuits in MAC 404. In another embodiment, bias element 914 (and the kernel coefficient 422) is set to a non-unit value. In this case, neural engine 314 multiplies the kernel coefficient 422 (bias element 914) with portion 408 of input data (bias elements 912) in each of the MAD circuits in MAC 404 to generate processed values 412 for accumulation by accumulators 414. After multiply-accumulate operations are performed for all M+1 channels (i.e., M channels without bias and one channel with bias), accumulators 414 produce processed values 412 to be output (e.g., after pre-processing in post-processor 428) as one channel of output data 328 having spatial width of N elements (i.e., N-dimensional vector 906) for storage into data buffer 318. In general, bias element 914 is programmable, and a value of bias element 914 may depend on a scheme used for quantization of portion of input data 322 (e.g., elements of matrix 902) and/or kernel data 326 (e.g., elements of vector 904).

Figure 9C:
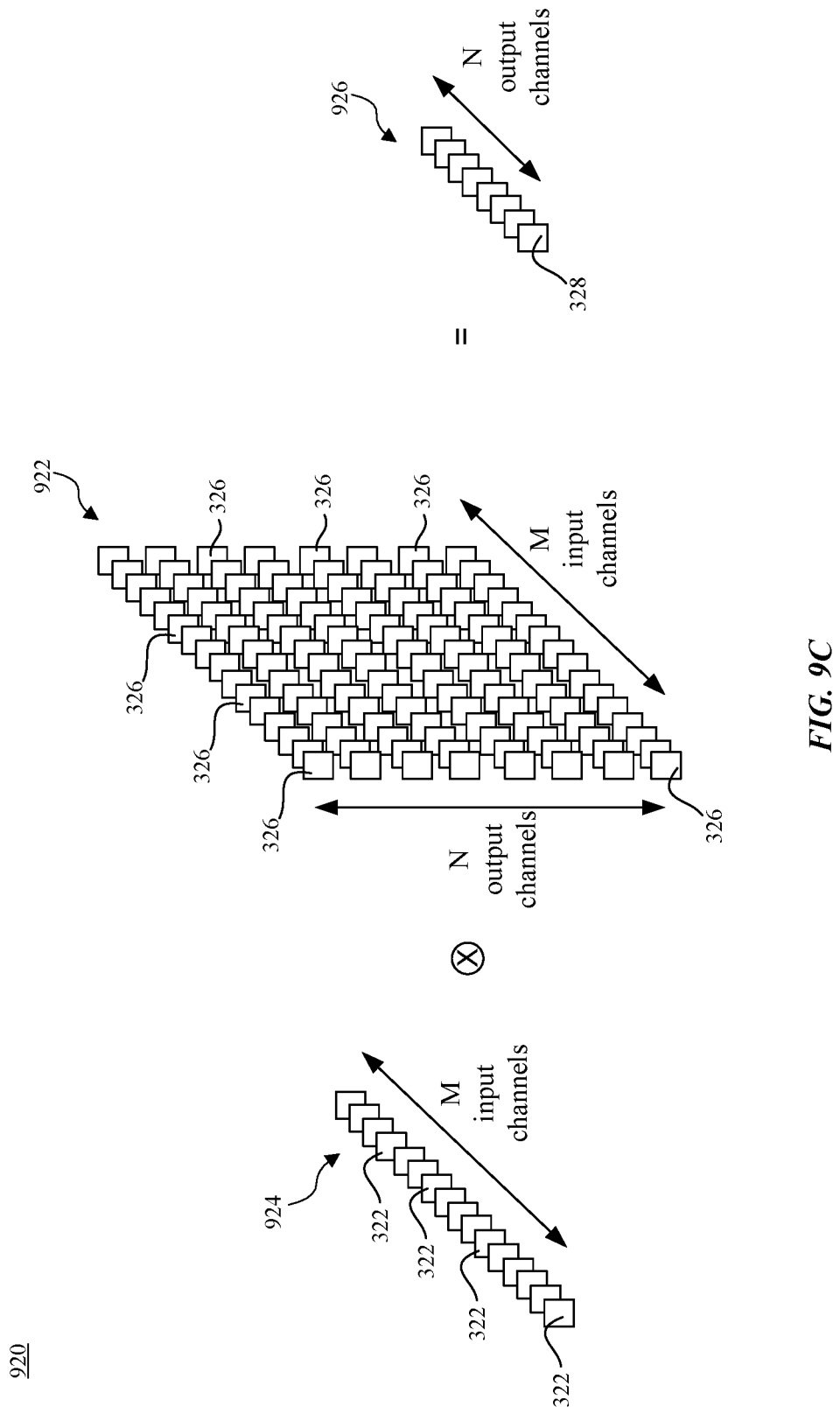
FIG. 9C is a conceptual diagram illustrating another mode of matrix-vector multiplication performed as a convolution by a neural processor circuit, according to one embodiment.

Neural processor circuit 218 may also perform matrix-vector multiplication as convolution on vector elements and matrix elements. The vector elements are routed to neural processor circuit 218 from data buffer 318 as portion of input data 322 and the matrix elements are routed to the neural processor circuit 218 via kernel DMA 324 as kernel data 326. FIG. 9C is a conceptual diagram 920 illustrating an alternative mode of matrix-vector multiplication performed as a convolution operation by neural processor circuit 218. In the illustrative embodiment shown in FIG. 9C, matrix-vector multiplication is performed between matrix 922 having matrix elements organized in N rows and M columns and vector 924 having M vector elements (M-dimensional vector). As shown in FIG. 9C, matrix 922 can be reshaped into 1×1 kernel data 326 with M input channels and N output channels. Vector 904 can be treated as M channels of 1×1 shaped input data 322. Neural engines 314 can perform multiplication between matrix 922 and vector 924 as a convolution operation on M-dimensional portion of input data 322 and 1×1 shaped kernel data 326 having M input channels and N output channel. The result of convolution is a new N-dimensional vector 926, i.e., output data 328 generated by neural engines 314 in N output channels.

Two or more of the neural engines 314 can be configured to receive elements of vector 924 from data buffer 318 as portion of input data 322, e.g., over at least one processing cycle. In an embodiment, data buffer 318 may broadcast elements of M-dimensional vector 924 as M-dimensional portion of input data 322 to input buffer circuits 402 of the two or more neural engines 314 over one or more processing cycles, which may depend on a value of M and precision of each vector element (e.g., floating point precision, integer precision, etc.). The M-dimensional portion of input data 322 representing elements of vector 924 may be then provided to MACs 404 of neural engines 314 as portions 408 of input data.

The two or more neural engines 314 may be further configured to receive matrix elements of matrix 922 from kernel DMA 324 over multiple processing cycles. Each of the two or more neural engines 314 may receive, from kernel DMA 324 at kernel extract circuit 432, different subsets of elements of matrix 922 corresponding to different M-dimensional rows of matrix 922. A subset of matrix elements (i.e., M-dimensional row of matrix 922) may be then extracted from kernel extract circuit 432 and provided as kernel coefficients 422 to MAC 404 of each of the two or more neural engines 314.

MAD circuits in each of the two or more neural engines 314 may multiply appropriate portions 408 of input data (i.e., elements of M-dimensional vector 924) with kernel coefficients 422 corresponding to an M-dimensional row of matrix 922. Processed values 412 generated in each processing cycle are further accumulated by accumulator 414 to generate processed values 412 for post-processing in post-processor 428 and processed values 417 associated with one output channel for storage in output circuit 424. Thus, after completion of the multiply-accumulate operations, each of the two or more neural engines 314 produces one output channel of processed values 417 over the multiple processing cycles. Multiple neural engines 314 of neural processor circuit 218 operating in parallel can generate multiple output channels of processed values 417 over the multiple processing cycles, until all N output channels of processed values 417 (and output data 328) are generated. Therefore, the two or more neural engines 314 can perform multiplication between matrix 922 and vector 924 as a convolution operation on the vector elements (as portion of input data 322) and the matrix elements (as kernel data 326) producing multiple output channels of output data 328 for storage into data buffer 318. Data buffer 318 may receive, from the two or more neural engines 314, multiple output channels (e.g., N output channels) of output data 328. Data buffer 318 may then interleave the multiple output channels of output data 328 to generate one output channel of output data 328 suitable for further operations, e.g., by neural processor circuit 214.

Figure 10A:
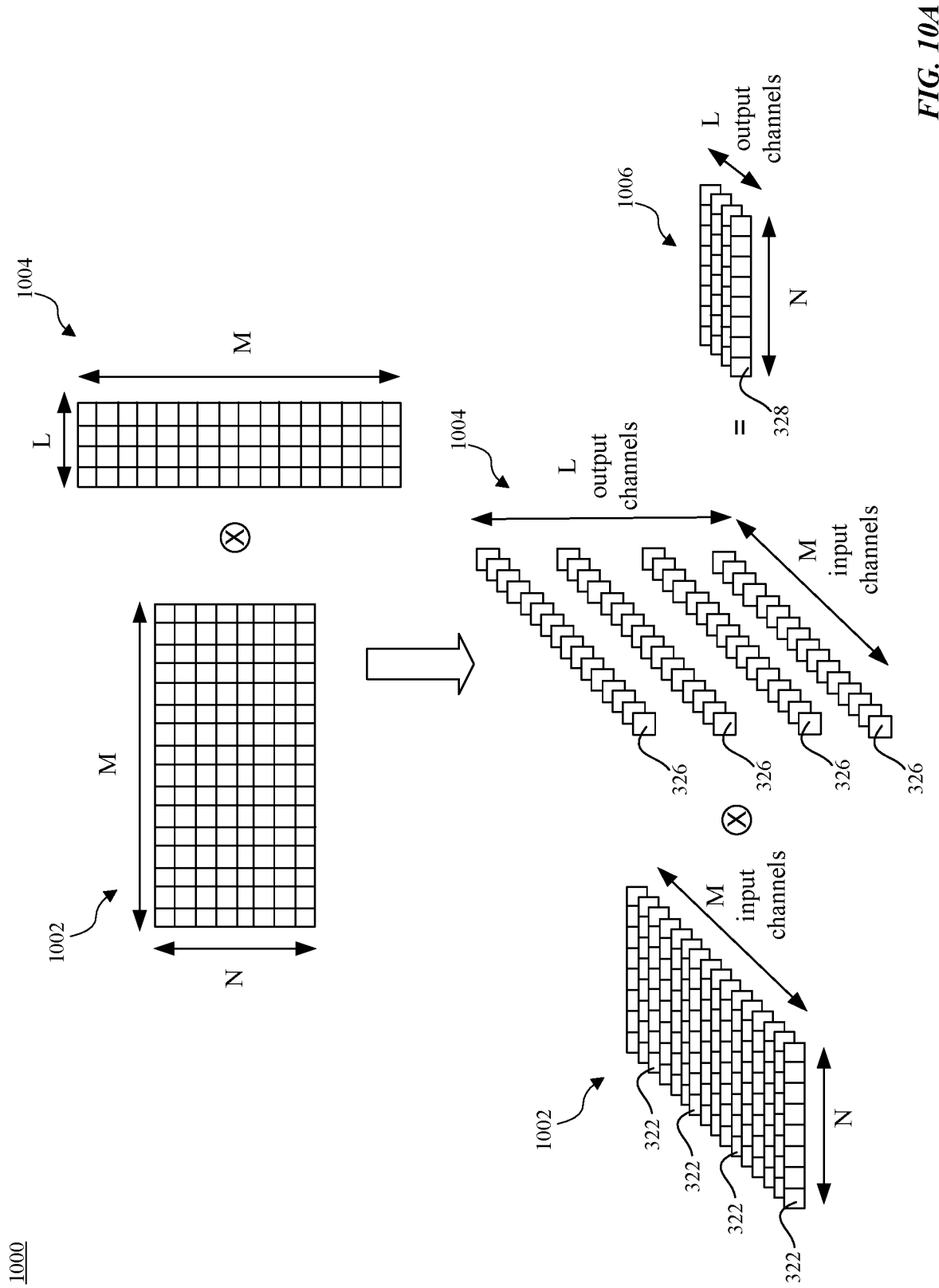
FIG. 10A is a conceptual diagram illustrating matrix-matrix multiplication performed as a convolution by a neural processor circuit, according to one embodiment.

Matrix-matrix multiplication is also a common operation in machine learning and computer vision applications. Matrix-matrix multiplication can be viewed as an extension of matrix-vector multiplication. FIG. 10A is a conceptual diagram 1000 illustrating matrix-matrix multiplication treated by neural processor circuit 218 as a convolution operation having multiple output channels, according to one embodiment. In the illustrative embodiment shown in FIG. 10A, the matrix-vector multiplication is performed between matrix 1002 having matrix elements organized in N rows and M columns and matrix 1004 having matrix elements organized in M rows and L columns. As shown in FIG. 10A, matrix 1002 can be reshaped into portion of input data 322 having spatial width of N, spatial height of one and M channels. Matrix 1004 can be treated as 1×1 shaped kernel data 326 (i.e., kernel coefficient) having M input channels and L output channels. At least one of the neural engines 314 can perform multiplication between the matrix 1002 and the matrix 1004 as convolution operation on N-dimensional portion of input data 322 and 1×1 kernel data 326 having M input channels and L output channel. The result of convolution is a new matrix 1006, i.e., L channels of output data 328, each channel having spatial width of N and spatial height of one.

Fetching elements of matrix 1002 can be performed in the same manner as fetching elements of matrix 902 of FIG. 9A, except that more than one neural engine 314 may fetch the same elements of matrix 1002. Thus, neural engines 314 may receive elements of matrix 1002 from data buffer 318 as portion of input data 322. In an embodiment, data buffer 318 may broadcast each column of matrix 1002 as the N-dimensional portion of input data 322 to input buffer circuit 402 of neural engine 314 over one or more processing cycles, which may depend on a value of N and precision of the matrix elements (e.g., floating point precision, integer precision, etc.). The N-dimensional portion of input data 322 representing a column of matrix 1002 may be then provided to MAC 404 as the portion 408 of input data. As further shown in FIG. 10A, the matrix 1004 may be split into L individual vectors. Each individual vector of the L vectors may be received by an individual neural engine 314 (of one or more active neural engines 314) via kernel DMA 324 and kernel extract circuit 432 as kernel coefficients 422, in the same manner as vector elements of vector 904 of FIG. 9A.

Each of the MAD circuits MAD0 through MADN of the MAC 404 in neural engine 314 may store an input value of portion 408 of input data (e.g., an element of the N-dimensional column of the matrix 1002) and the corresponding kernel coefficient 422 (e.g., an element in one column of the matrix 1004). Each input value of portion 408 (each column element) and the corresponding kernel coefficient 422 (one vector element) are multiplied in each of the MAD circuits to generate processed values 412 for accumulation by accumulators 414. In one embodiment, input values of portion 408 of input data are floating point 16-bit numbers, and neural engines 314 are configured to operate in the convolution mode supporting floating point 16-bit operands (i.e., FP16 convolution mode). In FP16 convolution mode, MAC 404 of each active neural engine 314 may be configured to multiply (using MAD circuits MAD0 through MADN) 128 input values of portion 408 and two kernel coefficients 422 during a processing cycle. In another embodiment, input values of portion 408 of input data are 8-bit integers, and neural engines 314 are configured to operate in the convolution mode supporting 8-bit integer operands (i.e., INT8 convolution mode). In INT8 convolution mode, MAC 404 of each active neural engine 314 may be configured to multiply 256 input values of portion 408 and one kernel coefficient 422 during a processing cycle. Accumulators 414 may be configured for accumulation of 32-bit integer operands, i.e., accumulated processed values 412 may be 32-bit integers.

Over multiple processing cycles, neural engine 314 may perform multiply-accumulate operations for M channels of N-dimensional portion of input data 322 and kernel coefficients 422 and for L output channels using L different sets of kernel coefficients 422 to produce processed values 412 for post-processing. After post-processing in post-processor 428, processed values 417 may be then stored in output circuit 424 and output as L channels of output data 328, each channel having spatial width of N elements for storage into data buffer 318. Therefore, neural engine 314 performs multiplication between the matrix 1002 and the matrix 1004 as a convolution operation on the matrix elements of the matrix 1002 as portion of the input data 322 and the matrix elements of the matrix 1004 as kernel data 326 producing L output channels of output data 328 for storage into data buffer 318.

Figure 10B:
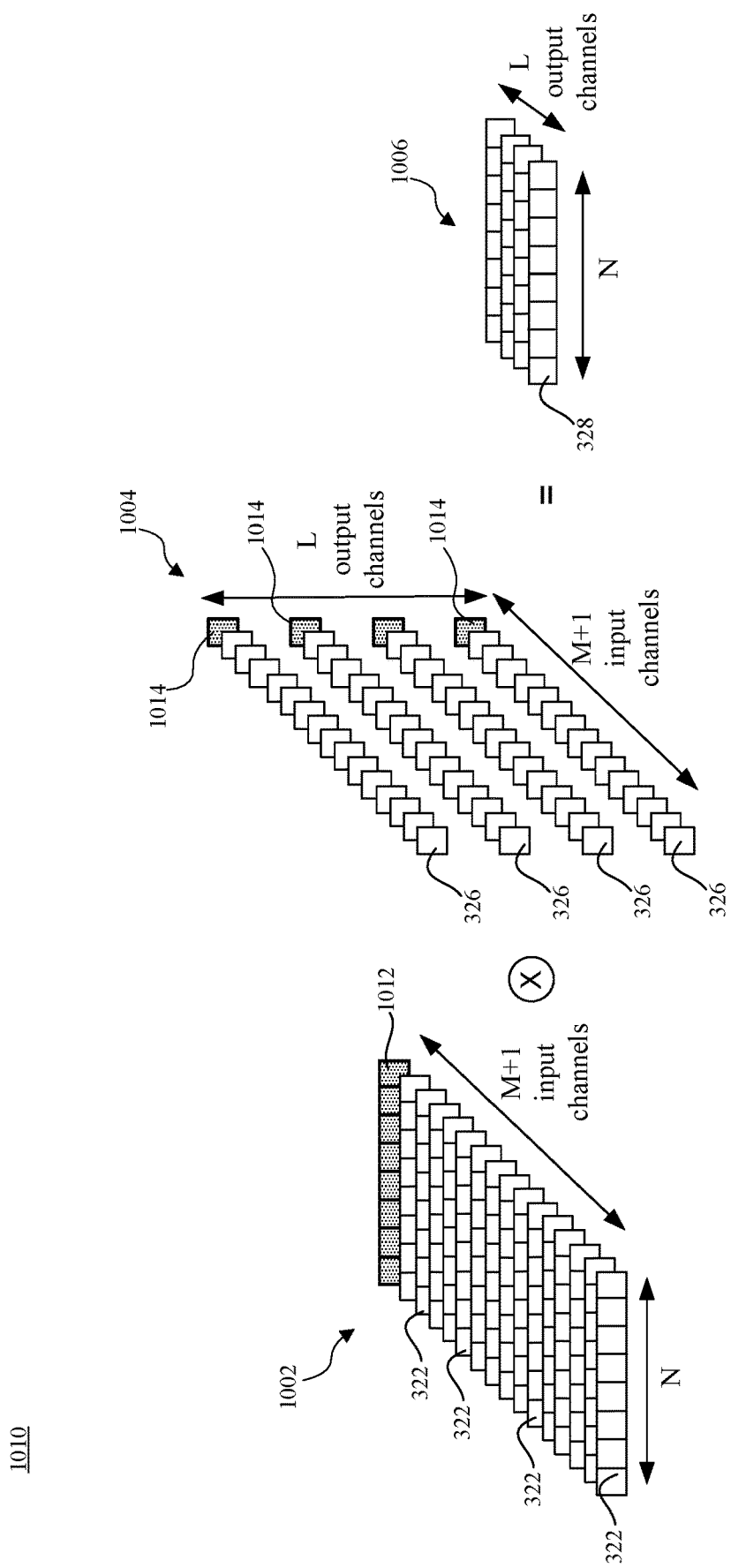
FIG. 10B is a conceptual diagram illustrating matrix-matrix multiplication with bias performed as a convolution by a neural processor circuit, according to one embodiment.

Matrix-matrix multiplication with bias can be similarly implemented as an extension of matrix-vector multiplication with bias illustrated in FIG. 9B. FIG. 10B is a conceptual diagram 1010 illustrating matrix-matrix multiplication with bias treated as a convolution by neural processor circuit 218, according to one embodiment. Elements 1012 of the bias vector b are merged as an additional column into matrix 1002 having now N rows and M+1 columns, which may be reshaped into portion of input data 322 having spatial width of N, spatial height of one and M+1 channels. Bias elements 1014 may also merged to each individual vector of L vectors of matrix 1004, wherein each individual vector of matrix 1004 can be treated as a 1×1 kernel data 326 (i.e., kernel coefficient) with M+1 input channels and L output channels. Therefore, similarly as for the matrix-matrix multiplication without bias, neural engine 314 can perform the matrix-matrix multiplication with bias as a convolution on N-dimensional portion of input data 322 and 1×1 kernel data 326 having M+1 input channels and L output channels.

Neural engine 314 can receive bias elements 1012 from data buffer 318 as portion of input data 322, e.g., during at least one processing cycle. Data buffer 318 may broadcast bias elements 1012 as the N-dimensional portion of input data 322 to input buffer circuit 402 of neural engine 314. The N-dimensional portion of input data 322 that includes bias elements 1012 may be then provided to MAC 404 as portion 408 of input data. Neural engine 314 may further receive, from kernel DMA 324 and via kernel extract circuit 432, bias elements 1014 as kernel coefficients 422. Kernel coefficients 422 may be then provided to each of the MAD circuits MAD0 through MADN of MAC 404. Portion 408 of input data (i.e., bias elements 1012) and the corresponding kernel coefficient 422 (i.e., one bias element 1014) may be multiplied in each of the MAD circuits to generate processed values 412 for accumulation by accumulators 414. In one embodiment, bias elements 1014 (and corresponding kernel coefficients 422) are each set to a unit value, as defined in equation (1). In this case, neural engine 314 may bypass fetching of kernel coefficients 422 by kernel DMA 324, and bypass multiplication in each of the MAD circuits in MAC 404. In another embodiment, bias elements 1014 (and corresponding kernel coefficients 422) are each set to a non-unit value. In this case, neural engine 314 multiplies the kernel coefficients 422 (bias elements 1014) with portion 408 of input data (bias elements 1012) in each of the MAD circuits in MAC 404 to generate processed values 412 for accumulation by accumulators 414. After multiply-accumulate operations are performed for all M+1 input channels (i.e., M input channels without bias and one input channel with bias) and for L output channel, accumulators 414 of neural engine 314 produce processed values 412 for post-processing in post-processor 428. After post-processing, processed values 417 are stored into output circuit 424. Processed values 417 generated by neural engine 314 may be output as L output channels of output data 328 (i.e., matrix 1006 of N rows and L columns) for storage into data buffer 318. In general, bias elements 1014 is programmable, and values of bias elements 1014 may depend on a scheme used for quantization of portion of input data 322 (e.g., elements of matrix 1002) and/or kernel data 326 (e.g., elements of vector 1004).

Figure 10C:
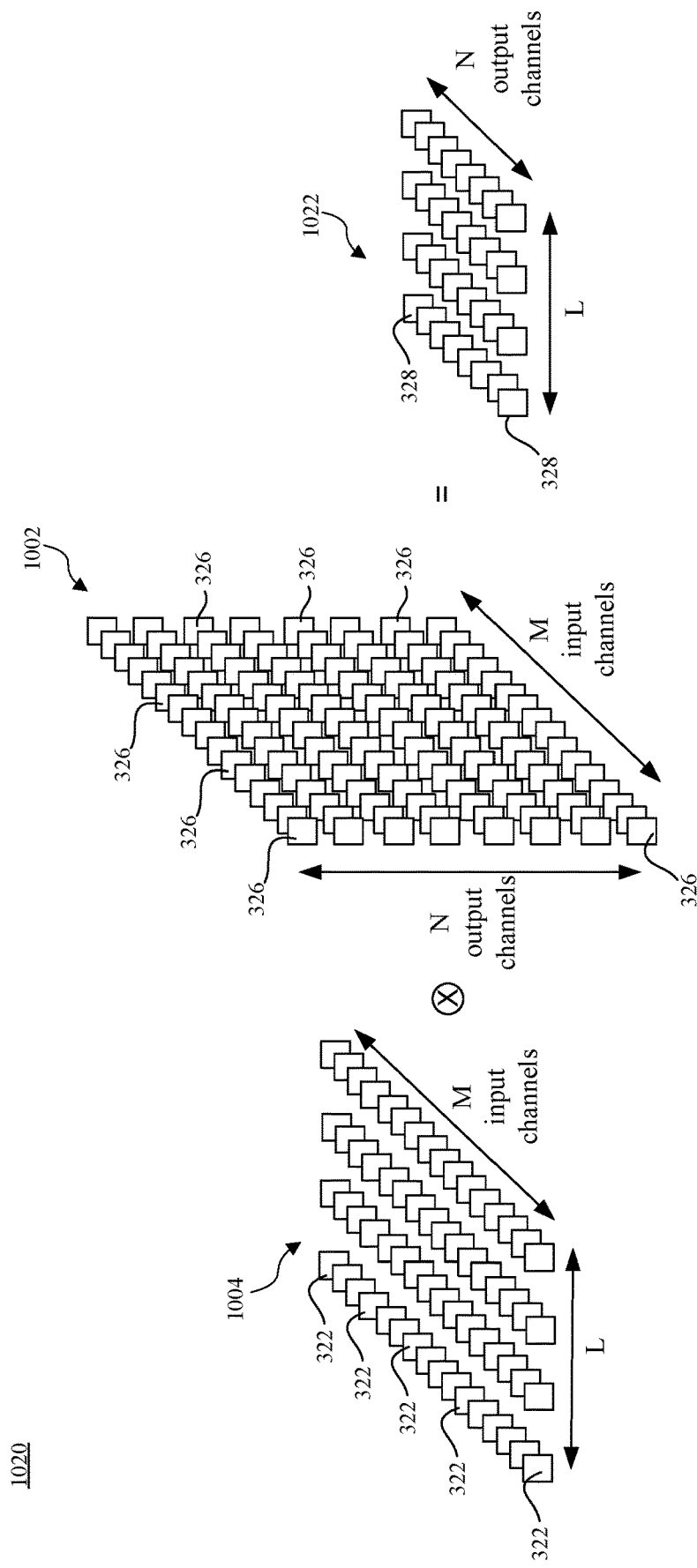
FIG. 10C is a conceptual diagram illustrating another mode of matrix-matrix multiplication performed as a convolution by a neural processor circuit, according to one embodiment.

FIG. 10C is a conceptual diagram 1020 illustrating an alternative mode of matrix-matrix multiplication performed as a convolution operation by neural processor circuit 218. As shown in FIG. 10C, matrix 1002 can be reshaped into 1×1 kernel data 326 with M input channels and N output channels. Matrix 1004 can be treated as L sets of M channels of 1×1 shaped input data 322. Neural engines 314 can perform multiplication between matrix 1002 and matrix 1004 as convolution operation on L sets of M-dimensional portion of input data 322 and 1×1 shaped kernel data 326 having M input channels and N output channel. The result of convolution is a new matrix 1022 that represents L vectors, each vector being N-dimensional vector. Thus, neural engines 314 generate output data 328 as L sets of values in N output channels.

Two or more of the neural engines 314 can be configured to receive elements of matrix 1004 from data buffer 318 as portion of input data 322. In an embodiment, data buffer 318 may broadcast L sets of M-dimensional portion of input data 322 to input buffer circuits 402 of the two or more neural engines 314 over multiple processing cycles. The number of processing cycles may depend on values of M, L, and on precision of each matrix element (e.g., floating point precision, integer precision, etc.). The M-dimensional portion of input data 322 representing one column of matrix 1004 (out of L columns) may be then provided to MACs 404 of neural engines 314 as portions 408 of input data.

The two or more neural engines 314 may be further configured to receive elements of matrix 1002 from kernel DMA 324 over multiple processing cycles. Each of the two or more neural engines 314 may receive, from kernel DMA 324 at kernel extract circuit 432, different subsets of elements of matrix 1002 corresponding to different M-dimensional rows of matrix 1002. A subset of matrix elements (i.e., M-dimensional row of matrix 1002) may be then extracted from kernel extract circuit 432 and provided as kernel coefficients 422 to MAC 404 of each of the two or more neural engines 314.

The MAD circuits in each of the two or more neural engines 314 may multiply appropriate portions 408 of input data (i.e., elements of M-dimensional column of matrix 1004) with kernel coefficients 422 corresponding to an M-dimensional row of matrix 1002. Processed values 412 generated in each processing cycle are further accumulated by accumulator 414 to generate processed values 412 for post-processing in post-processor 428. After post-processing, processed values 417 associated with one output channel are stored in output circuit 424. After completion of the multiply-accumulate operations, each of the two or more neural engines 314 produces one output channel of processed values 417 over the multiple processing cycles. Multiple neural engines 314 of neural processor circuit 218 operating in parallel can generate multiple output channels of processed values 417 (and output data 328) over the multiple processing cycles, until all L sets of N output channels of output data 328 are generated. Therefore, the two or more neural engines 314 can perform multiplication between matrix 1002 and matrix 1004 as a convolution operation on elements of matrix 1004 (as portion of input data 322) and elements of matrix 1002 (as kernel data 326) producing multiple output channels of output data 328 for storage into data buffer 318. Data buffer 318 may receive, from the two or more neural engines 314, L sets of N output channels of output data 328. Data buffer 318 may then interleave the L sets of N output channels of output data 328 to generate, e.g., L output channel of N-dimensional output data 328 suitable for further operations.

Element-Wise Operations as Convolution

Figure 11:
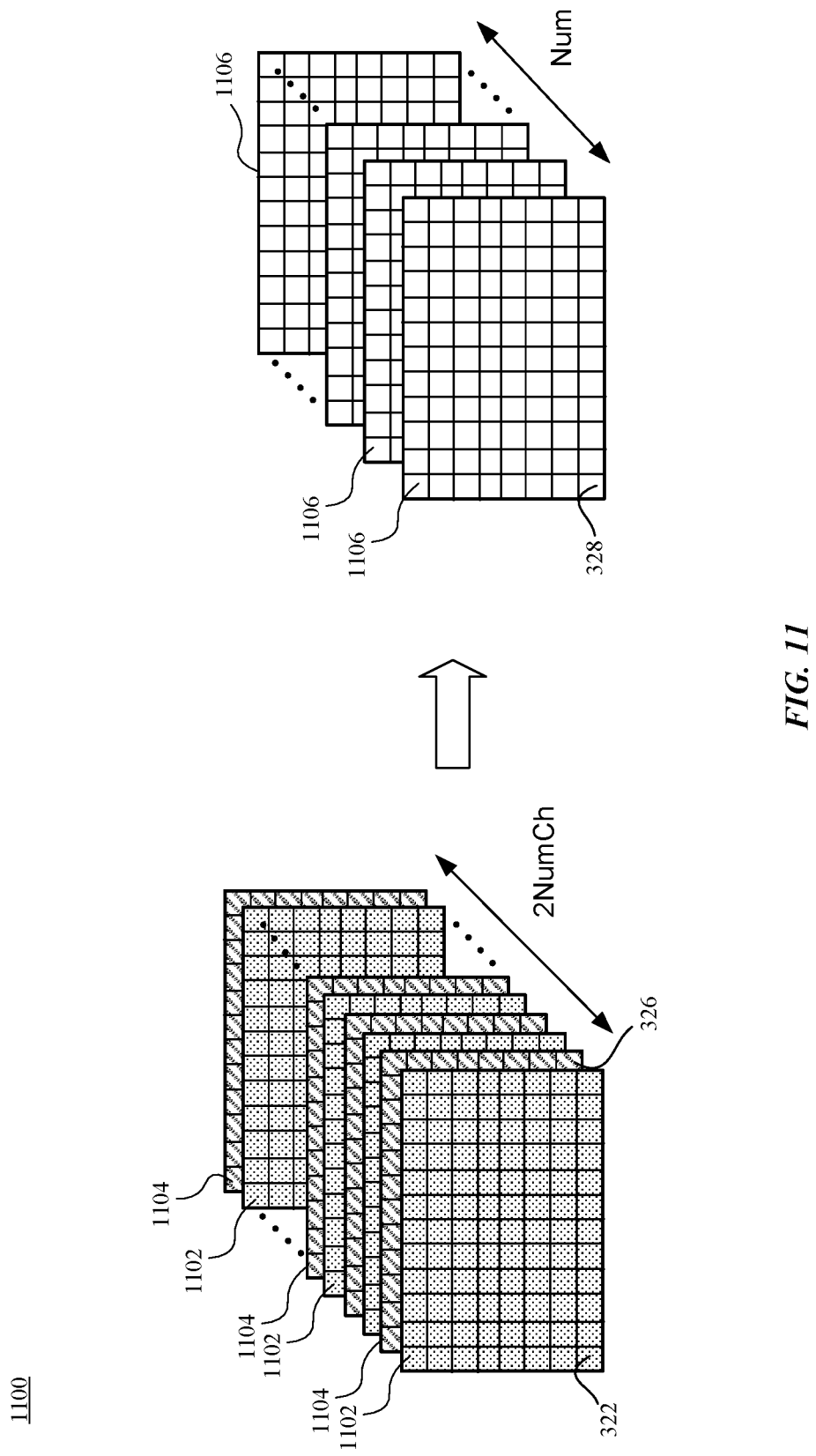
FIG. 11 is a conceptual diagram illustrating element-wise operations performed by a neural processor circuit, according to one or more embodiments.

An element-wise operation (e.g., element-wise addition, element-wise multiplication) uses two sets of input data of the same size to generate a set of output data of the same size, wherein input data may represent vectors, images, feature maps, etc. In element-wise multiplication, each output data is obtained by multiplying two input data from the two sets in the same location. In element-wise addition, each output data is obtained by adding two input data from the two sets in the same location. Two sets of input data 1102 and 1104 each having multiple channels may be interleaved in channel dimensions as shown in FIG. 11. In some embodiments, at least one of the neural engines 314 can be configured (e.g., by compiler) to perform an element-wise operation between each channel of input data 1102 and 1104 as a portion of group convolution with two input channels and one output channel.

For performing element-wise multiplication, at least one of the neural engines 314 may be configured to receive a first set of elements 1102 from data buffer 318 as portion of input data 322. Data buffer 318 may broadcast first set of elements 1102 as portion of input data 322 into input buffer circuit 402, which may be then provided to the MAD circuits of MAC 404 as portion 408 of input data. Neural engine 314 may further receive a second set of elements 1104 from data buffer 318 as portion of input data 322. Data buffer 318 may broadcast second set of elements 1102 as portion of input data 322 into input buffer circuit 402, which may be then provided to the MAD circuits of MAC 404 as portion 408 of input data. The MAD circuits of MAC 404 may perform element-wise multiplication between first set of elements 1102 and second set of elements 1104 to generate resulting values 1106 as processed values 412. In the case of no bias, neural engine 314 may be configured to bypass accumulators 414. Processed values 412 representing resulting values 1106 may be post-processed in post-processor 428, stored as processed values 417 in output circuit 424, and later output as at least one channel of output data 328 for storage into data buffer 318.

In the case of element-wise multiplication with bias, accumulators 414 of neural engine 314 may be pre-loaded with one or more bias values. The one or more values being pre-loaded in accumulator 414 may be then fed back as feedback information 419 to the MAD circuits of MAC 404 and added to processed values 412 generated by the MAD circuits to generate processed values 412 with the bias for post-processing in post-processor 428 and storage in output circuit 424 as processed values 417.

At least one of the neural engines 314 may be further configured to perform an element-wise addition operation. The at least one neural engine 314 may be configured to receive, from data buffer 318, first set of elements 1102 as portion of input data 322. Portion of input data 322 may be loaded into input buffer circuit 402 and provided to the MAD circuits of MAC 404 as portions 408 of input data. Neural engine 314 may further receive, at kernel extract circuit 432 via kernel DMA 324, second set of elements 1104 as kernel data 326. Kernel extract circuit 432 extracts kernel data 326 as kernel coefficients 422 for the MAD circuits of MAC 404. The MAD circuits of MAC 404 may perform element-wise addition between first set of elements 1102 and second set of elements 1104 to generate resulting values 1106 as processed values 412. Neural engine 314 may be further configured to bypass multipliers (not shown in FIG. 4) within the MAD circuits in MAC 404. Processed values 412 representing resulting values 1106 may be then post-processed in post-processor 428, stored as processed values 417 in output circuit 424, and later output as at least one channel of output data 328 for storage into data buffer 318.

In the case of element-wise addition with bias, accumulators 414 of neural engine 314 may be pre-loaded with one or more bias values. The one or more values being pre-loaded in accumulators 414 may be then fed back as feedback information 419 to the MAD circuits of MAC 404 and added to processed values 412 generated by the MAD circuits to generate processed values 412 with the bias for post-processing in post-processor 428 and storage in output circuit 424 as processed values 417.

Pooling operations are common operations utilized in CNN following convolution operations. An average pooling is an operation that obtains an average pixel intensity value in a region of pixels, wherein a size of the region corresponds to a size of kernel. The average pooling operation can be implemented by neural processor circuit 218 as regular convolution operation with unity kernel mode enabled. The unity kernel mode is a hardware feature that automatically feeds unity values (e.g., ones) to kernel coefficients 422. Thus, for average pooling operation, kernel data are not provided to kernel extract circuit 432, and kernel DMA 324 can be disabled. A set of pixels can be broadcast as portion of input data 322 from data buffer 318 to neural engine 314, stored into input buffer circuit 402, and provided to the MAD circuits of MAC 404 as portion 408 of input data. MAC 404 may perform accumulation of appropriate elements of portion 408 of input data as convolution with bypassed multiplication. Output values 412 from accumulators 414 may be then post-processed in post-processor 428 to perform scaling back of output values 412 (i.e., averaging) based on a spatial size of kernel data 326 to obtain processed values 417 for storage into output circuit 424.

A max pooling is an operation that determines maximum pixel intensity value in a region of pixels, wherein a size of the region corresponds to a size of kernel. In some embodiments, additional circuitry with compare units (not shown in FIG. 4) is included in MAC 404. The compare units may be activated when neural engine 314 is in max pooling mode. A set of pixels can be broadcast as portion of input data 322 from data buffer 318 to neural engine 314, stored into input buffer circuit 402, and provided to the compare units of MAC 404 as portion 408 of input data. The compare units in MAC 404 may perform max pooling (i.e., compare operations) on appropriate elements of portion 408 of input data. Output values 412 may be then post-processed in post-processor 428 to obtain processed values 417 for storage into output circuit 424. Alternatively, the MAD circuit in MAC 404 may be further configured to perform comparison instead of addition in the max pooling mode. For example, an adder in a MAD circuit of MAC 404 may be implemented to further support comparison between a pair of numbers. In this case, the MAD circuits in MAC 404 may perform max pooling (i.e., compare operations) on appropriate elements of portion 408 of input data, when MAC 404 is configured to be in the max pooling mode.

In addition to convolutions and pooling, the neural engines 314 supports certain operations for recurrent neural networks (RNN), such as Long-term Short-Term Memory (LSTM) operations. The neural engines 314 may operate on fully connected layers (e.g., matrix-vector multiplications) as convolutions, followed by element-wise operations on vectors with non-linear operations afterwards (e.g., tan h and sigmoid operations). The element-wise operations include element-wise multiplications and element-wise addition. Rasterizer 718 of data buffer 318 may instruct data buffer 318 to appropriately supply portion of input data 322 to the neural engines 314. Data buffer 318 may treat individual vectors as channel data. From the perspective of data buffer 318, element-wise operations are functionally the same as a convolution between a two-channel source and a single-channel destination. The element-wise operation mode can have a special enable bit in data buffer 318 because the neural engines 314 requires data buffer 318 to interleave channel data for the element-wise operation to facilitate interfacing with multipliers in MAC 404.

In some embodiments, the neural processor circuit 218 supports tensor product operations. The neural processor circuit 218 may perform tensor product as a group convolution by interleaving two element-wise sources together. Data buffer 318 may be configured to fetch from different discrete locations in the data buffer 318 two operands (e.g., two tensors), which may be then interleaved and broadcast to neural engines 314 as part of the unicast operation. Alternatively, the two operands may have different residency, e.g., one operand may be located in system memory 230 and other operand may be locally cached in data buffer 318. The tensors may have different extents, ranks, or orientations, which can be resolved as part of the unicast operation. For example, one tensor may have spatial support of W×H×C (i.e., spatial width of W, spatial height of H and C channel), and the other tensor may be a C-wide vector that is transposed and replicated to match the tensor having spatial support of W×H×C.

Example Processes at Neural Engine Architecture for Different Operations

Figure 12:
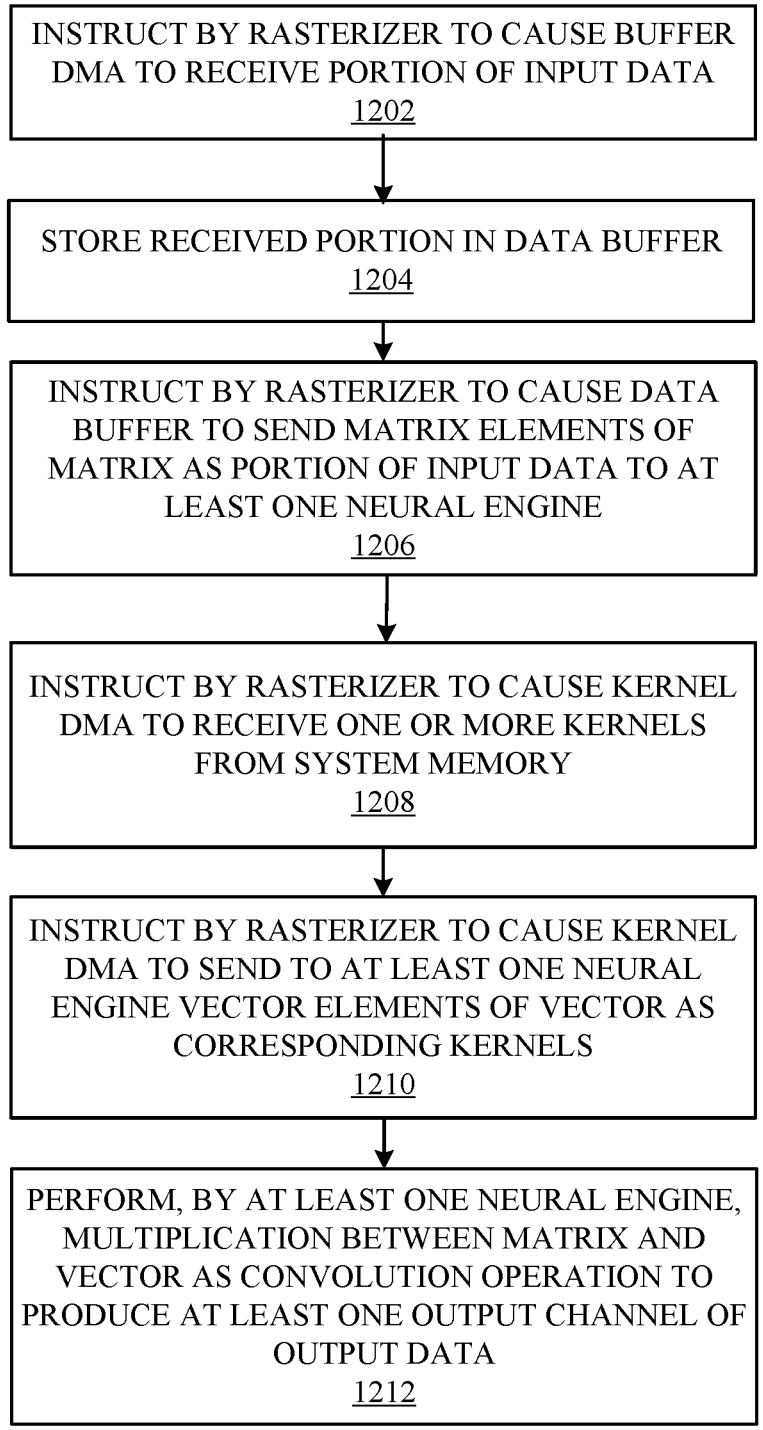
FIG. 12 is a flowchart illustrating a method of matrix-vector multiplication performed as a convolution by a neural processor circuit, according to one embodiment.

FIG. 12 is a flowchart illustrating a method of matrix-vector multiplication performed as a convolution by neural processor circuit 218, according to one embodiment. After neural task manager 310 programs rasterizers 714, 718, 720, 722, the process of operating buffer DMA 320 is initiated by rasterizer 720 instructing 1202 buffer DMA 320 (i.e., data reader) to cause buffer DMA 320 to receive at least a portion of input data from system memory 230. The portion of input data received by buffer DMA 320 is stored 1204 in data buffer 318. The portion of the input data includes a work unit of the input data.

Rasterizer 718 in data buffer 318 then instructs 1206 data buffer 318 to send matrix elements of a matrix as the portion of the input data to at least one of the neural engine circuits. The work unit of input data (e.g., at least a portion of the matrix elements) is then stored in input buffer circuit 402 of neural engine 314.

Rasterizer 722 in kernel DMA 324 (kernel fetcher circuit) then instructs 1208 kernel DMA 324 to receive one or more kernels from system memory 230. Rasterizer 722 in kernel DMA 324 then instructs 1210 kernel DMA 324 to send to neural engine 314 vector elements of a vector, each of the vector elements being extracted from kernel extract circuit 432 as a corresponding kernel coefficient 422 provided to MAC 404 of neural engine 314 in each of the processing cycles.

Neural engine 314 then performs 1212 multiplication between the matrix and the vector as a convolution operation to produce at least one output channel of output data 328. Neural engine 314 performs, as part of the convolution operation, multiply-accumulate operations on a subset of the matrix elements corresponding to each column of the matrix and each of the vector elements during each of the processing cycles.

Rasterizer 718 in data buffer 318 may also instruct data buffer 318 to send vector elements of another vector to two or more of the neural engines 314 over at least one processing cycle. The vector elements may be stored in input buffer circuits 402 of the two or more of the neural engines 314. Rasterizer 722 in kernel DMA 324 may also instruct kernel DMA 324 to send matrix elements of another matrix to the two or more of the neural engines 314 over multiple processing cycles. A portion of the other matrix elements may be stored as kernel data 326 in kernel extract circuit 432 and extracted as kernel coefficients 422. The two or more of neural engines 314 perform multiplication between the other matrix and the other vector as a convolution operation on the other vector elements and the other matrix elements to produce multiple output channels of output data 328.

Rasterizer 718 in data buffer 318 may also instruct data buffer 318 to send matrix elements of a second matrix to neural engine 314 over multiple processing cycles. At least a portion of the second matrix elements (i.e., work unit) is then stored in input buffer circuit 402 of neural engine 314. Rasterizer 722 in kernel DMA 324 may also instruct kernel DMA 324 to send matrix elements of a third matrix to neural engine 314 over the multiple processing cycles. A portion of the third matrix elements may be stored as kernel data 326 in kernel extract circuit 432 and extracted as kernel coefficients 422. Neural engine 314 performs multiplication between the second matrix and the third matrix as a convolution operation on the second matrix elements and the third matrix elements producing multiple output channels of output data 328.

Rasterizer 718 in data buffer 318 may also instruct data buffer 318 to send a first set of elements to neural engine 314. At least a portion of the first set of elements (i.e., work unit) is then stored in input buffer circuit 402 of neural engine 314, and provided as portion 408 of input data to the MAD circuits of MAC 404. Rasterizer 718 in data buffer 318 may further instruct data buffer 318 to send a second set of elements to neural engine 314. At least a portion of the second set of elements (i.e., work unit) is then stored in input buffer circuit 402 of neural engine 314, and provided as portion 408 of input data to the MAD circuits of MAC 404. Neural engine 314 then performs (e.g., via multipliers in the MAD circuits of MAC 404) element-wise multiplication between the first set of elements and the second set of elements as a portion of convolution operation on the first set of elements and the second set of elements producing at least one output channel of output data 328.

Rasterizer 718 in data buffer 318 may also instruct data buffer 318 to send a first set of elements to neural engine 314. At least a portion of the first set of elements (i.e., work unit) is then stored in input buffer circuit 402 of neural engine 314. Rasterizer 722 in kernel DMA 324 may also instruct kernel DMA 324 to send a second set of elements to neural engine 314. A portion of the second set of elements may be stored as kernel data 326 in kernel extract circuit 432 and extracted as kernel coefficients 422. Neural engine 314 performs element-wise addition between the first set of elements and the second set of elements as a portion of convolution operation on the first set of elements and the second set of elements producing at least one output channel of output data 328.

Embodiments of the process as described above with reference to FIG. 12 are merely illustrative. Further operations may be embodied, as described above with reference to FIGS. 9A-9C, FIGS. 10A-10C, FIG. 11. Moreover, sequence of the process may be modified or omitted.

While particular embodiments and applications have been illustrated and described, it is to be understood that the invention is not limited to the precise construction and components disclosed herein and that various modifications, changes and variations which will be apparent to those skilled in the art may be made in the arrangement, operation and details of the method and apparatus disclosed herein without departing from the spirit and scope of the present disclosure.

What is claimed is:

1. A neural processor circuit, comprising:
 a plurality of neural engine circuits;
 a data buffer between the plurality of neural engine circuits and a system memory external to the neural processor circuit, the data buffer configured to store at least a portion of input data received from the system memory for sending to the neural engine circuits and to store output data received from the neural engine circuits, the portion of the input data comprising a work unit of the input data; and
 a kernel fetcher circuit between the plurality of neural engine circuits and the system memory, the kernel fetcher circuit configured to receive one or more kernels from the system memory, and send a corresponding kernel to a neural engine circuit of the plurality of neural engine circuits, wherein
 in a first mode, the neural engine circuit is configured to perform a first convolution operation on at least the work unit of input data and the corresponding kernel to generate the output data, and
 in a second mode, the neural engine circuit is configured to:
  receive a plurality of matrix elements of a matrix as at least the portion of the input data from the data buffer over a plurality of processing cycles,
  receive a plurality of vector elements of a vector from the kernel fetcher circuit, each of the vector elements extracted as the corresponding kernel to the neural engine circuit in each of the plurality of processing cycles, and
  perform multiplication between the matrix and the vector as a second convolution operation to produce at least one output channel of the output data.

2. The neural processor circuit of claim 1, wherein, in the second mode, the neural engine circuit is further configured to:
 perform, as part of the second convolution operation, multiply-accumulate operations on a subset of the matrix elements corresponding to each column of the matrix and each of the vector elements during each of the plurality of processing cycles.

3. The neural processor circuit of claim 1, wherein, in a third mode, the neural engine circuit is further configured to:
 receive a plurality of bias elements of a bias vector from the data buffer during a processing cycle;
 receive a kernel coefficient from the kernel fetcher circuit during the processing cycle; and
 perform, using multiply-add circuits and an accumulator in the neural engine circuit, multiply-accumulate operations on the bias elements and the kernel coefficient as part of a third convolution operation.

4. The neural processor circuit of claim 1, wherein two or more of the neural engine circuits are configured to:
 receive another plurality of vector elements of another vector from the data buffer over at least one processing cycle;
 receive another plurality of matrix elements of another matrix from the kernel fetcher circuit over multiple processing cycles; and
 perform multiplication between the other matrix and the other vector as a third convolution operation on the other vector elements and the other matrix elements to produce multiple output channels of the output data.

5. The neural processor circuit of claim 4, wherein each of the two or more neural engine circuits is further configured to:
 perform, as part of the third convolution operation, multiply-accumulate operations on the other vector elements and a subset of the other matrix elements corresponding to a row of the other matrix; and produce, after completion of the multiply-accumulate operations, an output channel of the multiple output channels of the output data.

6. The neural processor circuit of claim 5, wherein the data buffer is further configured to:
receive, from the two or more neural engine circuits, the multiple output channels of the output data; and
interleave the multiple output channels of the output data to generate one output channel of the output data.

7. The neural processor circuit of claim 1, wherein, in a third mode, the neural engine circuit is further configured to:
receive a second plurality of matrix elements of a second matrix from the data buffer over multiple processing cycles;
receive a third plurality of matrix elements of a third matrix from the kernel fetcher circuit over the multiple processing cycles; and
perform multiplication between the second matrix and the third matrix as a third convolution operation on the second matrix elements and the third matrix elements producing multiple output channels of the output data.

8. The neural processor circuit of claim 7, wherein two or more of the neural engine circuits are configured to:
receive the second matrix elements from the data buffer;
receive the third matrix elements from the kernel fetcher circuit; and
perform multiplication between the second matrix and the third matrix as the third convolution operation on the second matrix elements and the third matrix elements, using multiply-add circuits and accumulators in each of the two or more neural engine circuits producing one or more output channels of the multiple output channels of the output data.

9. The neural processor circuit of claim 1, wherein, in a third mode, the neural engine circuit is further configured to:
receive a first set of elements from the data buffer;
receive a second set of elements from the data buffer; and
perform element-wise multiplication between the first set of elements and the second set of elements as a portion of a third convolution operation on the first set of elements and the second set of elements producing one or more output channels of the output data.

10. The neural processor circuit of claim 9, wherein, in the third mode, the neural engine circuit is further configured to:
pre-load an accumulator of the neural engine circuit with a bias value over a processing cycle; and
perform the portion of the third convolution operation as multiply-accumulate operations on the first set of elements and the second set of elements using multiply-add circuits and the pre-loaded accumulator of the neural engine circuit.

11. The neural processor circuit of claim 1, wherein, in a third mode, the neural engine circuit is further configured to:
receive a first set of elements from the data buffer;
receive a second set of elements from the kernel fetcher circuit; and
perform element-wise addition between the first set of elements and the second set of elements as a portion of a third convolution operation on the first set of elements and the second set of elements producing one or more output channels of the output data.

12. The neural processor circuit of claim 11, wherein, in the third mode, the neural engine circuit is further configured to:
pre-load an accumulator of the neural engine circuit with a bias value over a processing cycle; and
perform the portion of the third convolution operation as multiply-accumulate operations on the first set of elements and the second set of elements using multiply-add circuits with bypassed multipliers and the pre-loaded accumulator of the neural engine circuit.

13. A method of operating a neural processor circuit, comprising:
instructing, by a first rasterizer circuit in a data reader of the neural processor circuit, to cause the data reader to receive a portion of input data from a system memory external to the neural processor circuit, the portion of the input data comprising a work unit of the input data;
storing the portion of the input data in a data buffer of the neural processor circuit;
instructing, in a first mode by a second rasterizer circuit in the data buffer, to cause the data buffer to send a plurality of matrix elements of a matrix as at least the portion of the input data to a neural engine circuit of a plurality of neural engine circuits in the neural processor circuit;
instructing, by a third rasterizer circuit in a kernel fetcher circuit between the plurality of neural engine circuits and the system memory, to cause the kernel fetcher circuit to receive one or more kernels from the system memory and send a corresponding kernel to the neural engine circuit;
instructing, in the first mode by the third rasterizer circuit, to cause the kernel fetcher circuit to send to the neural engine circuit a plurality of vector elements of a vector, each of the vector elements extracted as the corresponding kernel to the neural engine circuit in each of a plurality of processing cycles;
performing, in the first mode by the neural engine circuit, multiplication between the matrix and the vector as a first convolution operation to produce at least one output channel of output data; and
performing, in a second mode by the neural engine circuit, a second convolution operation on at least the work unit of input data and the corresponding kernel to generate the output data.

14. The method of claim 13, wherein performing multiplication between the matrix and the vector as the first convolution operation comprising:
performing, as part of the first convolution operation, multiply-accumulate operations on a subset of the matrix elements corresponding to each column of the matrix and each of the vector elements during each of the plurality of processing cycles.

15. The method of claim 13, further comprising:
instructing, by the second rasterizer circuit, to cause the data buffer to send another plurality of vector elements of another vector to two or more of the neural engine circuits over at least one processing cycle;
instructing, by the third rasterizer circuit, to cause the kernel fetcher circuit to send another plurality of matrix elements of another matrix to the two or more of the neural engine circuits over multiple processing cycles; and
performing, by the two or more of the neural engine circuits, multiplication between the other matrix and the other vector as a third convolution operation on the other vector elements and the other matrix elements to produce multiple output channels of the output data.

16. The method of claim 15, further comprising:
performing, as part of the third convolution operation, multiply-accumulate operations on the other vector elements and a subset of the other matrix elements corresponding to a row of the other matrix; and producing, after completion of the multiply-accumulate operations, an output channel of the multiple output channels of the output data.

17. The method of claim 13, further comprising:

instructing, in a third mode by the second rasterizer circuit, to cause the data buffer to send a second plurality of matrix elements of a second matrix to the neural engine circuit over multiple processing cycles;

instructing, in the third mode by the third rasterizer circuit, to cause the kernel fetcher circuit to send a third plurality of matrix elements of a third matrix to the neural engine circuit over the multiple processing cycles; and performing, in the third mode by the neural engine circuit, multiplication between the second matrix and the third matrix as a third convolution operation on the second matrix elements and the third matrix elements producing multiple output channels of the output data.

18. The method of claim 13, further comprising:

instructing, in a third mode by the second rasterizer circuit, to cause the data buffer to send a first set of elements to the neural engine circuit;

instructing, in the third mode by the second rasterizer circuit, to cause the data buffer to send a second set of elements to the neural engine circuit; and performing, in the third mode by the neural engine circuit, element-wise multiplication between the first set of elements and the second set of elements as a third convolution operation on the first set of elements and the second set of elements producing one or more output channels of the output data.

19. The method of claim 13, further comprising:

instructing, in a third mode by the second rasterizer circuit, to cause the data buffer to send a first set of elements to the neural engine circuit;

instructing, in the third mode by the third rasterizer circuit, to cause the kernel fetcher circuit to send a second set of elements to the neural engine circuit; and performing, in the third mode by the neural engine circuit, element-wise addition between the first set of elements and the second set of elements as a third convolution operation on the first set of elements and the second set of elements producing one or more output channels of the output data.

20. An electronic device, comprising:

a neural processor circuit including a plurality of neural engine circuits, a data buffer and a kernel fetcher circuit; and a system memory external to the neural processor circuit, wherein the data buffer is configured to:

store at least a portion of input data received from the system memory for sending to the neural engine circuits, the portion of the input data comprising a work unit of the input data, and store output data received from the neural engine circuits, wherein the kernel fetcher circuit is configured to:

receive one or more kernels from the system memory, and send a corresponding kernel to a neural engine circuit of the plurality of neural engine circuits, and wherein in a first mode, the neural engine circuit is configured to perform a first convolution operation on at least the work unit of input data and the corresponding kernel to generate the output data, and in a second mode, the neural engine circuit is configured to:

receive a plurality of matrix elements of a matrix as at least the portion of the input data from the data buffer over a plurality of processing cycles, receive a plurality of vector elements of a vector from the kernel fetcher circuit, each of the vector elements extracted as the corresponding kernel to the neural engine circuit in each of the plurality of processing cycles, and perform multiplication between the matrix and the vector as a second convolution operation to produce at least one output channel of the output data.

* * * * *